(12) United States Patent
Wilson

(10) Patent No.: US 7,212,466 B2
(45) Date of Patent: May 1, 2007

(54) PRODUCING AMPLITUDE VALUES FOR CONTROLLING PIXEL ILLUMINATION ON A SONAR DISPLAY

(75) Inventor: Douglas James Wilson, Port Coquitlam (CA)

(73) Assignee: Imagenex Technology Corp., Port Coquitlam, British Columbia (CA)

( * ) Notice: Subject to any disclaimer, the term of this patent is extended or adjusted under 35 U.S.C. 154(b) by 378 days.

(21) Appl. No.: 10/891,655

(22) Filed: Jul. 15, 2004

(65) Prior Publication Data

US 2006/0013068 A1    Jan. 19, 2006

(51) Int. Cl.
*G03B 42/06* (2006.01)
(52) U.S. Cl. ............................ 367/68; 367/7
(58) Field of Classification Search ............... 367/7, 367/68, 111
See application file for complete search history.

(56) References Cited

U.S. PATENT DOCUMENTS

| | | | |
|---|---|---|---|
| 4,030,062 A | 6/1977 | Diehl et al. | |
| 4,170,766 A | 10/1979 | Pridham et al. | |
| 4,190,818 A | 2/1980 | Follin et al. | |
| 4,237,737 A | 12/1980 | Nitadori | 73/625 |
| 4,290,127 A | 9/1981 | Pridham et al. | |
| 4,686,532 A | 8/1987 | McAulay | |
| 4,688,045 A | 8/1987 | Knudsen | |
| 4,817,614 A | 4/1989 | Hassler et al. | |
| 5,216,640 A | 6/1993 | Donald et al. | |
| 5,349,524 A * | 9/1994 | Daft et al. | 367/7 |
| 5,619,998 A | 4/1997 | Abdel-Malek et al. | |
| 5,647,365 A | 7/1997 | Abboud | |

(Continued)

FOREIGN PATENT DOCUMENTS

JP          62082379 A     4/1987
WO       WO 97/04334 A1  2/1997

OTHER PUBLICATIONS

Urick, Robert J., *Principles of underwater sound*, 3rd ed., 1983, p. 65, McGraw-Hill Inc., New York.
Texas Instruments TMS320C3x Gerneral-Purpose Applications User's Guide, Literature No. SPRU194, Jan. 1998, pp. 6-80 to 6-101, Texas Instruments Incorporated, U.S.A.
G. Blacquiere et al., "Multibeam Echosounding: Beamforming versus Interferometry" (Mar. 1998) Oceanology International.
C.D. Loggins, "Ahead-Look Sonars: Design Comparisons and Performance Considerations" (Jul./Aug. 1995) Underwater Systems Design.

*Primary Examiner*—Ian J. Lobo
(74) *Attorney, Agent, or Firm*—Woodcock Washburn LLP

(57) ABSTRACT

A method and apparatus for producing an amplitude value for use in controlling illumination of a pixel on a display, in response to a sampled sonar signal produced by an element of a sonar array. A pixel time associated with the pixel is found, the pixel time representing a time required for sound to travel a distance represented by the pixel, according to a range of distance to be viewed on the display. A sample point of the sampled sonar signal is then found, the sample point having a sample time nearest the pixel time. A delay value associated with the pixel is then found, the delay value including an array element delay value. A representation of a synthesized waveform is then produced, in response to the sonar signal, the representation comprising a plurality of sample points coinciding in time with the sample points of the sonar signal. An amplitude value representing an amplitude of the synthesized waveform at a time corresponding to the pixel time is then produced by finding an amplitude value of the waveform at a time value corresponding to the sum of the sample time and the delay value. The amplitude value is then made available for use in illuminating the pixel.

72 Claims, 11 Drawing Sheets

U.S. PATENT DOCUMENTS

| | | |
|---|---|---|
| 5,793,703 A | 8/1998 | Shippey .................. 367/88 |
| 5,822,276 A | 10/1998 | Miklovic |
| 5,886,951 A | 3/1999 | Wagstaff et al. ............ 367/135 |
| 6,088,295 A | 7/2000 | Altes |
| 6,130,641 A * | 10/2000 | Kraeutner et al. .......... 342/179 |
| 6,485,423 B2 | 11/2002 | Angelsen et al. |
| 6,509,871 B2 | 1/2003 | Bevington |
| 6,624,783 B1 | 9/2003 | Rabideau |
| 6,654,315 B1 | 11/2003 | Carter et al. |
| 6,784,835 B2 | 8/2004 | Kohno et al. ............... 342/360 |

* cited by examiner

| DEPTH RANGE | DELTA FREQUENCY | REFERENCE FREQUENCY | SAMPLING FREQUENCY | CUTOFF FREQUENCY | PING LENGTH |
|---|---|---|---|---|---|
| 5 m | 30.46875 kHz | 350.46875 kHz | 75.0 kHz | 34.0 kHz | 30 μSec |
| 10 m | 15.234 kHz | 335.234 kHz | 37.5 kHz | 17.0 kHz | 60 μSec |
| 40 m | 3.80859 kHz | 323.80859 kHz | 9.375 kHz | 4.25 kHz | 240 μSec |
| 100 m | 1.5234 kHz | 321.5234 kHz | 3.75 kHz | 1.7 kHz | 600 μSec |

$$\begin{aligned}
\Sigma\,(&\vec{M}_{AB}+\vec{M}_{AC}+\vec{M}_{AD}+\vec{M}_{AE}+\vec{M}_{AF}+\vec{M}_{AG}+\vec{M}_{AH}+\vec{M}_{AI}+\vec{M}_{AJ}+\vec{M}_{AK}+\vec{M}_{AL}+\vec{M}_{AM}+\vec{M}_{AN}+\vec{M}_{AO}+\vec{M}_{AP}+ \\
&\vec{M}_{BC}+\vec{M}_{BD}+\vec{M}_{BE}+\vec{M}_{BF}+\vec{M}_{BG}+\vec{M}_{BH}+\vec{M}_{BI}+\vec{M}_{BJ}+\vec{M}_{BK}+\vec{M}_{BL}+\vec{M}_{BM}+\vec{M}_{BN}+\vec{M}_{BO}+\vec{M}_{BP}+ \\
&\vec{M}_{CD}+\vec{M}_{CE}+\vec{M}_{CF}+\vec{M}_{CG}+\vec{M}_{CH}+\vec{M}_{CI}+\vec{M}_{CJ}+\vec{M}_{CK}+\vec{M}_{CL}+\vec{M}_{CM}+\vec{M}_{CN}+\vec{M}_{CO}+\vec{M}_{CP}+ \\
&\vec{M}_{DE}+\vec{M}_{DF}+\vec{M}_{DG}+\vec{M}_{DH}+\vec{M}_{DI}+\vec{M}_{DJ}+\vec{M}_{DK}+\vec{M}_{DL}+\vec{M}_{DM}+\vec{M}_{DN}+\vec{M}_{DO}+\vec{M}_{DP}+ \\
&\vec{M}_{EF}+\vec{M}_{EG}+\vec{M}_{EH}+\vec{M}_{EI}+\vec{M}_{EJ}+\vec{M}_{EK}+\vec{M}_{EL}+\vec{M}_{EM}+\vec{M}_{EN}+\vec{M}_{EO}+\vec{M}_{EP}+ \\
&\vec{M}_{FG}+\vec{M}_{FH}+\vec{M}_{FI}+\vec{M}_{FJ}+\vec{M}_{FK}+\vec{M}_{FL}+\vec{M}_{FM}+\vec{M}_{FN}+\vec{M}_{FO}+\vec{M}_{FP}+ \\
&\vec{M}_{GH}+\vec{M}_{GI}+\vec{M}_{GJ}+\vec{M}_{GK}+\vec{M}_{GL}+\vec{M}_{GM}+\vec{M}_{GN}+\vec{M}_{GO}+\vec{M}_{GP}+ \\
&\vec{M}_{HI}+\vec{M}_{HJ}+\vec{M}_{HK}+\vec{M}_{HL}+\vec{M}_{HM}+\vec{M}_{HN}+\vec{M}_{HO}+\vec{M}_{HP}+ \\
&\vec{M}_{IJ}+\vec{M}_{IK}+\vec{M}_{IL}+\vec{M}_{IM}+\vec{M}_{IN}+\vec{M}_{IO}+\vec{M}_{IP}+ \\
&\vec{M}_{JK}+\vec{M}_{JL}+\vec{M}_{JM}+\vec{M}_{JN}+\vec{M}_{JO}+\vec{M}_{JP}+ \\
&\vec{M}_{KL}+\vec{M}_{KM}+\vec{M}_{KN}+\vec{M}_{KO}+\vec{M}_{KP}+ \\
&\vec{M}_{LM}+\vec{M}_{LN}+\vec{M}_{LO}+\vec{M}_{LP}+ \\
&\vec{M}_{MN}+\vec{M}_{MO}+\vec{M}_{MP}+ \\
&\vec{M}_{NO}+\vec{M}_{NP}+ \\
&\vec{M}_{OP})
\end{aligned}$$

FIG. 12

PRODUCING AMPLITUDE VALUES FOR CONTROLLING PIXEL ILLUMINATION ON A SONAR DISPLAY

BACKGROUND OF THE INVENTION

1. Field of Invention

This invention relates to sonar systems and more particularly to apparatus, methods, media and signals for producing an amplitude value for use in controlling illumination of a pixel on a display and apparatus and methods for controlling a sonar transducer unit.

2. Description of Related Art

Underwater imaging systems are often used to map or display underwater features such as an ocean floor and to detect the presence of underwater bodies, such as fish. Some conventional underwater imaging systems generate a sonar signal and underwater objects reflect the sonar signal, producing reflected sonar signals, which may be received at a plurality of array elements spaced apart in a receiver array, for example. The receiver array produces signals that are interpreted to produce a display image depicting the underwater object.

Conventional underwater imaging systems typically include a beamformer that delays the signals produced by each element of the receiver array by an appropriate amount to correct for differences in arrival times of sound wave reflections at the array. The array elements closer to a reflecting object receive a reflected sound wave from that object sooner than array elements farther away. Thus, the signals produced by the array elements must be delayed by amounts dependent upon the respective differences in travel time for the reflected sound wave to reach the respective array elements in order to combine the signals produced by the array elements to produce a composite signal indicative of the reflection received at the array. The appropriate amount of delay required for each received signal varies with the angle of view of the array.

To achieve the above mentioned delays, some conventional underwater imaging systems pass the signals produced by the array elements through a delay line having a fixed delay, such as a coaxial cable. The use of fixed delays, however, can only provide the appropriate delay for one viewing angle. Selecting among a variety of fixed delay lines associated with corresponding viewing angles increases the size and expense of the underwater imaging system.

Some conventional underwater imaging systems digitally sample the signals produced by the elements of the array to produce digital representations of the received signals. These digital representations may then be digitally delayed. The digital representations may be digitally delayed directly in the time domain or may be transformed to the frequency domain such as by a Fourier Transform, multiplied by a phase factor, and then transformed back to the time domain such as by an inverse Fourier Transform. The delay amounts may be calculated using, for example, correlation or filter functions implemented in the time domain or frequency domain, or may be pre-calculated delay amounts stored, for example, in look-up tables. However, sampling rates sufficiently high to digitally represent the received signals without introducing quantization error may not be feasible. Furthermore, delay amounts equal to a multiple of the interval of time between samples may not be sufficiently accurate. Attempts to digitally delay the digital representations by delay amounts which are not multiples of the sampling interval require specialized hardware components such as shift registers arranged in a parallel configuration which increases the cost, size and complexity of such imaging systems.

Some conventional underwater imaging systems use mixers to translate the frequency of the received signals to a lower frequency, thereby permitting the use of a lower sampling rate when digitally sampling the received signals. However, the problem of inaccurate delay when the delay amounts are multiples of the sampling interval is exacerbated by the use of a lower sampling rate. Furthermore, frequency translation alters the relationship between the period of the signal and the differences in the arrival times of the respective received signals.

SUMMARY OF THE INVENTION

In accordance with one aspect of the invention, there is provided a method of producing an amplitude value for use in controlling illumination of a pixel on a display, in response to a sampled sonar signal produced by an element of a sonar array. The method involves finding a pixel time associated with the pixel, the pixel time representing a time required for sound to travel a distance represented by the pixel according to a range of distance to be viewed on the display. The method further involves finding a sample point of the sampled sonar signal having a sample time nearest the pixel time and finding a delay value associated with the pixel, the delay value including an array element delay value. The method further involves producing a representation of a synthesized waveform, in response to the sonar signal, the representation comprising a plurality of sample points coinciding in time with the sample points of the sonar signal and producing an amplitude value representing an instantaneous amplitude of the synthesized waveform at a time corresponding to the pixel time by finding an amplitude value of the waveform at a time value corresponding to the sum of the sample time and the delay value and making the amplitude value available for use in illuminating the pixel.

Producing a representation of the synthesized waveform may involve producing a plurality of cosine and sine values representing real and imaginary portions of the synthesized waveform at respective sample points in time.

Finding a sample point may involve finding cosine and sine values for a sample point having a sample time nearest the pixel time.

Finding a delay value may involve finding cosine and sine amplitude values for the delay value.

Producing an amplitude value may involve adding the product of the cosine values for the sample point having a sample time nearest the pixel time and the delay value respectively to the product of the sine values for the sample point having a sample time nearest the pixel time and the delay value respectively.

Producing an amplitude value may involve adding the product of the sine value for the sample point having a sample time nearest the pixel time and the cosine of the delay value respectively to the product of the cosine value for the sample point having a sample time nearest the pixel time and the sine of the delay value respectively.

The delay value may be pre-calculated before the representation of the synthesized waveform is produced.

Producing the representation of the waveform may involve producing frequency domain sample values in response to time domain sample values of the sonar signal. Producing frequency domain sample values may involve performing a Fourier Transform on the time domain sample values.

The method may further involve performing an inverse Fourier Transform on the frequency domain sample values.

The Fourier Transform and the inverse Fourier Transform may be performed by a processor programmed to execute a Fourier Transform and an inverse Fourier Transform.

The processor may produce a plurality of cosine and sine values representing real and imaginary portions of the synthesized waveform at respective sample points in time.

Finding a delay value may involve locating a pre-stored delay value in memory.

The pre-stored delay value may be stored in the memory before the representation of the synthesized waveform is produced.

The method may involve calculating the pre-stored delay value as a function of the array element delay value and a difference delay value representing a difference in time between the sample time and the pixel time.

Finding the delay value may involve calculating the array element delay value by calculating array-dependent delay values for a plurality of beam angles within a field of view of the array.

The array-dependent delay values may be calculated as function of array element separation distance, sampling rate of the sonar signal and beam angle and speed of sound.

The array-dependent delay values associated with respective beam angles may be stored in association with identifications of pixels on the display that are associated with the same beam angle.

The method may involve calculating the difference delay value by calculating a fractional value representing the difference in time between the sample time and the pixel time as a fraction of a sample period between two sample times nearest the pixel time.

Calculating the fractional value may involve finding a ratio of the difference between a sample-defined distance and a pixel-defined distance to a sample distance on said synthesized waveform.

Calculating the difference delay value may involve multiplying the fractional value by the number of radians per sample at an acoustic frequency of the sonar signal.

The method may involve for each pixel associated with a distance within the field of view of the array, adding an associated array dependent delay value to an associated difference delay value to produce the delay value and finding cosine and sine values for the delay value.

The method may involve storing the cosine and sine values for the delay value in association with an identification of a pixel with which the delay value is associated.

The method may involve repeating the set of actions above or a subset thereof for each element in the sonar array until amplitude values for each element in the array are available for the pixel.

The method may involve summing the amplitude values for each element in the array to produce an illumination value for the pixel.

The method may involve using the illumination value to control illumination of the pixel.

The method may involve repeating the set of actions above or a subset thereof for the sonar signal from each respective receive element to produce real and imaginary component values for the synthesized waveforms associated with respective array elements.

The method may involve producing modified amplitude values for the real and imaginary component values for each synthesized waveform according to the following relations:

For $Z=A$ to $P$: $Z_R = \text{sign}(R_Z)\sqrt{\text{abs}(R_Z)}$ $Z_I = \text{sign}(I_Z)\sqrt{\text{abs}(I_Z)}$ The method may involve producing real and imaginary quadrature multiplication values for each of all unique possible combinations of array elements, in response to the modified amplitude values.

The real quadrature components may be produced according to the relations:

$$M_{RAB} = (A_R B_R - A_I B_I);$$

$$M_{RAC} = (A_R C_R - A_I C_I);$$

$$\vdots$$

$$M_{RYZ} = (Y_R Z_R - Y_I Z_I)$$

and the imaginary quadrature components may be produced according to the relations:

$$M_{IAB} = (A_R B_I + A_I B_R);$$

$$M_{IAC} = (A_R C_I + A_I C_R);$$

$$\vdots$$

$$M_{IYZ} = (Y_R Z_I + Y_I Z_R)$$

where A–Z denote array elements and can denote any number of a plurality of array elements The method may involve summing the real quadrature components to produce a real magnitude value $M_R$ and summing the imaginary quadrature components to produce an imaginary magnitude value $M_I$ and imaginary quadrature components, respectively.

The method may involve summing the real and imaginary magnitude values to produce a single value according to the relation:

$$M = \sqrt{M_R^2 + M_I^2}$$

The method may involve scaling the single value to produce an illumination value.

The method may involve using the illumination value to control illumination of the pixel.

In accordance with another aspect of the invention, there is provided an apparatus for producing an amplitude value for use in controlling illumination of a pixel on a display, in response to a sampled sonar signal produced by an element of a sonar array. The apparatus includes a component operable to find a pixel time associated with the pixel, the pixel time representing a time required for sound to travel a distance represented by the pixel, according to a range of distance to be viewed on the display. The apparatus further includes a component operable to find a sample point of the sampled sonar signal, having a sample time nearest the pixel time. The apparatus further includes a component operable to find a delay value associated with the pixel, the delay value including an array element delay value. The apparatus further includes a component operable to produce a representation of a synthesized waveform, in response to the sonar signal, the representation comprising a plurality of sample points coinciding in time with the sample points of the sonar signal. The apparatus further includes a component operable to produce an amplitude value representing an amplitude of the synthesized waveform at a time corresponding to the pixel time by finding an amplitude value of the waveform at a time value corresponding to the sum of the sample time and the delay value and a component operable to make the amplitude value available for use in illuminating the pixel.

The component operable to produce a representation of the synthesized waveform may include a processor configured to produce a plurality of cosine and sine values representing real and imaginary portions of the synthesized waveform at respective sample points in time.

The component operable to find a sample point may include a processor configured to find cosine and sine values for a sample point having a sample time nearest the pixel time.

The component operable to find a delay value may include a processor configured to find cosine and sine amplitude values for the delay value.

The component operable to produce an amplitude value may include a processor configured to add the product of the cosine values for the sample point having a sample time nearest the pixel time and the delay value respectively to the product of the sine values for the sample point having a sample time nearest the pixel time and the delay value respectively.

The component operable to produce an amplitude value may include a processor configured to add the product of the sine value for the sample point having a sample time nearest the pixel time and the cosine of the delay value respectively to the product of the cosine value for the sample point having a sample time nearest the pixel time and the sine of the delay value respectively.

The component operable to find the delay value may include a processor configured to pre-calculate the delay value, before the representation of the synthesized waveform is produced.

The component operable to produce the representation of the waveform may include a processor configured to produce frequency domain sample values in response to time domain sample values of the sonar signal. The processor may be configured to perform a Fourier Transform on the time domain sample values.

The processor may be configured to perform an Inverse Fourier Transform on the frequency domain sample values.

The processor may be configured to produce a plurality of cosine and sine values representing real and imaginary portions of the synthesized waveform at respective sample points in time as a result of the Inverse Fourier Transform.

The component operable to find a delay value may include a memory for storing a pre-stored delay value and a processor configured to locate the pre-stored delay value in memory.

The processor may be configured to pre-store the pre-stored delay value in the memory before the representation of the synthesized waveform is produced.

The processor may be configured to calculate the pre-stored delay value as a function of the array element delay value and a difference delay value representing a difference in time between the sample time and the pixel time.

The processor may be configured to find the array element delay value by calculating array-dependent delay values for a plurality of beam angles within a field of view of the array.

The processor may be configured to calculate the array-dependent delay values as function of array element separation distance, sampling rate of the sonar signal and beam angle and speed of sound.

The processor may be configured to store the array-dependent delay values associated with respective beam angles in association with identifications of pixels on the display that are associated with the same beam angle.

The processor may be configured to calculate the difference delay value by calculating a fractional value representing the difference in time between the sample time and the pixel time as a fraction of a sample period between two sample times nearest the pixel time.

The processor may be configured to calculate the fractional value by finding a ratio of the difference between a sample-defined distance and a pixel-defined distance to a sample distance on the synthesized waveform.

The processor may be configured to calculate the difference delay value by multiplying the fractional value by the number of radians per sample at an acoustic frequency of the sonar signal.

The processor may be configured to add an associated array dependent delay value to an associated difference delay value to produce the delay value and find cosine and sine values for the delay value for each pixel associated with a distance within the field of view of the array.

The apparatus may include memory and the processor may be configured to store the cosine and sine values for the delay value in association with an identification of a pixel with which the delay value is associated.

Each of the components listed in the broad description of the apparatus above may be implemented by the same processor and the processor may be configured to produce amplitude values for each element in the array for a given pixel.

The processor may be configured to sum the amplitude values for each element in the array to produce an illumination value for the pixel.

The processor may be configured to use the illumination value to control illumination of the pixel.

The processor may be configured to produce real and imaginary component values for synthesized waveforms associated with respective array elements.

The processor may be configured to produce modified amplitude values for the real and imaginary component values for each synthesized waveform according to the following relations:

$$\text{For } Z=A \text{ to } P: Z_R = \text{sign}(R_Z)\sqrt{\text{abs}(R_Z)}$$

$$Z_I = \text{sign}(I_Z)\sqrt{\text{abs}(I_Z)}$$

The processor may be configured to produce real and imaginary quadrature multiplication values for each of all unique possible combinations of array elements, in response to the modified amplitude values.

The processor may be configured to produce the real quadrature multiplication components according to the relations:

$$M_{RAB} = (A_R B_R - A_I B_I);$$

$$M_{RAC} = (A_R C_R - A_I C_I);$$

$$\vdots$$

$$M_{RYZ} = (Y_R Z_R - Y_I Z_I)$$

and the imaginary quadrature components may be produced according to the relations:

$$M_{IAB} = (A_R B_I + A_I B_R);$$

$$M_{IAC} = (A_R C_I + A_I C_R);$$

$$\vdots$$

$$M_{IYZ} = (Y_R Z_I + Y_I Z_R)$$

where: A–Z denote array elements and can denote any number of a plurality of array elements The processor may be configured to sum the real and imaginary magnitude values $M_R$ and $M_I$ to produce a single value M according to the relation:

$$M = \sqrt{M_R^2 + M_I^2}$$

The processor may be configured to sum the real quadrature components to produce a real magnitude value $M_R$ and sum the imaginary quadrature components to produce an imaginary magnitude value $M_I$.

The processor may be configured to scale the single value to produce an illumination value.

The processor may be configured to use the illumination value to control illumination of the pixel.

In accordance with another aspect of the invention, there is provided a computer readable medium encoded with codes for directing a processor to execute the method and its variations described above.

In accordance with another aspect of the invention, there is provided, a computer readable signal encoded with codes for directing a processor to execute the method and its variations described above.

In accordance with another aspect of the invention, there is provided an apparatus for producing an amplitude value for use in controlling illumination of a pixel on a display, in response to a sampled sonar signal produced by an element of a sonar array. The apparatus includes provisions for finding a pixel time associated with the pixel, the pixel time representing a time required for sound to travel a distance represented by the pixel, according to a range of distance to be viewed on the display. The apparatus further includes provisions for finding a sample point of the sampled sonar signal, having a sample time nearest the pixel time and provisions for finding a delay value associated with the pixel, the delay value including an array element delay value. The apparatus further includes provisions for producing a representation of a synthesized waveform, in response to the sonar signal, the representation comprising a plurality of sample points coinciding in time with the sample points of the sonar signal. The apparatus further includes provisions for producing an amplitude value representing an amplitude of the synthesized waveform at a time corresponding to the pixel time by finding an amplitude value of the waveform at a time value corresponding to the sum of the sample time and the delay value, and provisions for making the amplitude value available for use in illuminating the pixel.

In accordance with another aspect of the invention, there is provided a method of operating a sonar signal receiver. The method involves receiving a reflected acoustic signal burst at a plurality of array elements to produce a plurality of received signals, generating a reference signal having a reference signal frequency dependent on a depth range of interest, heterodyning each of the received signals with the reference signal to produce respective beat signals having a beat frequency, sampling each of the beat signals at a sampling frequency dependent on the beat frequency to produce sets of sample values, each set being associated with a corresponding array element, and making the each set of sample values available for processing.

Generating the reference signal may involve causing a reference signal generator to produce the reference signal.

Causing the reference frequency generator to produce the reference signal may involve producing a local command signal for controlling the reference signal generator in response to a remote command signal received from a remote device.

Producing the local command signal may involve extracting depth range information from the remote command signal and producing the local command signal in response to the depth range information.

Sampling may involve causing a sampling signal generator to produce a sampling signal and using the sampling signal to control a sampling component to sample the each of the beat signals at a sampling frequency.

Causing the sampling signal generator to produce the sampling signal may involve producing a local command signal for controlling the sampling frequency generator in response to a remote command signal received from a remote device.

Producing the local command signal may involve extracting depth range information from the remote command signal and producing the local command signal in response to the depth range information.

Generating the reference signal frequency may involve causing a reference signal generator to produce the reference signal in response to the local command signal.

The method may involve causing the reference frequency generator and the sampling frequency generator to respond to the local command signal such that a pre-defined number of sample values is included in each of the sets of sample values no matter what depth range is indicated by the depth range information.

Heterodyning may involve mixing the reference signal with respective received signals to produce a mixed signal and filtering the mixed signal to produce the beat signal.

Filtering may involve using cutoff frequency controlled filters to filter respective mixed signals.

The method may involve causing the cutoff frequency of the cutoff frequency controlled filters to be dependent on the beat frequency.

The method may involve producing a local command signal in response to depth range information received in the remote command signal from a remotely located device and controlling the cutoff frequency may comprise producing a cutoff frequency control signal for controlling the cutoff frequency controlled filters, in response to the local command signal.

The method may involve producing a sonar signal burst to create the reflected acoustic signal burst. Producing a sonar signal burst may involve controlling a sonar signal transducer to produce the sonar signal burst such that the sonar signal burst has an acoustic frequency and a ping length.

The method may involve producing a local command signal in response to depth range information in a remote command signal received from a remotely located device and producing a sonar signal burst may comprise controlling the sonar signal transducer to produce the sonar signal burst with a ping length determined in response to the local command signal.

Controlling the sonar signal transducer may involve controlling the sonar signal transducer such that the ping length is longer at greater depth ranges and shorter at lesser depth ranges.

Making the each set of sample values available for processing may involve transmitting the each set to a remotely located processor.

In accordance with another aspect of the invention, there is provided a sonar signal receiver apparatus. The apparatus includes an array of array elements operable to receive a reflected acoustic signal burst and to produce a plurality of received signals, a reference signal generator configured to generate a reference signal having a reference signal frequency dependent on a depth range of interest, a heterodyning component operable to heterodyne each of the received signals with the reference signal to produce respective beat signals having a beat frequency and a sampling component operable to sample each of the beat signals at a sampling frequency dependent on the beat frequency to produce sets of sample values, each set being associated with a corresponding the array element.

The apparatus may include a processor configured to produce a local command signal for controlling the reference signal generator in response to a remote command signal received from a remote device.

The processor may be configured to extract depth range information from the remote command signal and produce the local command signal in response to the depth range information such that a reference frequency of the reference signal is dependent upon the depth range information.

The sampling component may include a sampling signal generator and an analog to digital converter, the sampling signal generator being configured to produce a sampling signal for controlling the analog to digital converter to sample each of the beat signals at a sampling frequency determined by the sampling signal.

The apparatus may include a processor configured to produce a local command signal for controlling the sampling signal generator in response to a remote command signal received from a remote device.

The processor may be configured to extract depth range information from the remote command signal and to produce the local command signal such that the sampling signal frequency is dependent upon the depth range information.

The processor may be configured to control the reference signal generator with the local command signal such that the reference frequency is dependent upon the depth information.

The processor may be configured to control the reference frequency generator and the sampling frequency generator with the local command signal such that a pre-defined number of sample values is included in each of the sets of sample values no matter what depth range is indicated by the depth range information.

The heterodyning component may involve a mixer configured to mix the reference signal with respective received signals to produce a mixed signal and a filter configured to filter the mixed signal to produce the beat signal. The filter may involve a cutoff frequency controlled filter.

The processor may be configured to control a cutoff frequency of the cutoff frequency controlled filter in response to depth information received from a remote command signal.

The apparatus may include a transducer configured to produce a sonar signal burst to create the reflected acoustic signal burst.

The apparatus may include a processor configured to control the sonar signal transducer to produce the sonar signal burst such that the sonar signal burst has an acoustic frequency and a ping length.

The processor may be configured to produce a local command signal in response to depth range information in a remote command signal received from a remotely located device and the processor may be configured to control the sonar signal transducer to produce the sonar signal burst with a ping length determined in response to the local command signal.

The processor circuit may be configured to control the sonar signal transducer such that the ping length is longer at greater depth ranges and shorter at lesser depth ranges.

The apparatus may include a transmitter configured to transmit each set of sample values to a remotely located processor.

In accordance with another aspect of the invention, there is provided a sonar signal receiver apparatus. The apparatus includes provisions for receiving a reflected acoustic signal burst at a plurality of array elements to produce a plurality of received signals, provisions for generating a reference signal having a reference signal frequency dependent on a depth range of interest, provisions for heterodyning each of the received signals with the reference signal to produce respective beat signals having a beat frequency and provisions for sampling each of the beat signals at a sampling frequency dependent on the beat frequency to produce sets of sample values, each set being associated with a corresponding array element and provisions for making each set of sample values available for processing.

In accordance with another aspect of the invention, there is provided a computer readable medium and/or signal encoded with codes for directing a processor circuit to receive a plurality of signals from a plurality of array elements operable to receive a reflected acoustic signal burst, generate a reference signal having a reference signal frequency dependent on a depth range of interest, heterodyne each of the received signals with the reference signal to produce respective beat signals having a beat frequency, sample each of the beat signals at a sampling frequency dependent on the beat frequency to produce sets of sample values, each set being associated with a corresponding said array element, and make each set of sample values available for processing to produce signal for causing a display to be illuminated.

In accordance with another aspect of the invention, there is provided a method of controlling a pixel on a display in response to sonar data from a plurality of array elements in a sonar array. The method involves producing synthesized time-amplitude representations of acoustic pressure received at respective array elements in response to actual time-amplitude representations received from the array elements, locating time positions associated with the pixel, in respective synthesized time-amplitude representations, producing real and imaginary components for each of the time positions, and cross-correlating the real and imaginary components to produce a single scalar value to control illumination intensity of a pixel associated with the common pixel position.

Cross-correlating may involve producing modified amplitude values for the real and imaginary component values for each synthesized waveform according to the relations:

For $Z=A$ to $P$: $Z_R=\text{sign}(R_Z)\sqrt{\text{abs}(R_Z)}$ $Z_I=\text{sign}(I_Z)\sqrt{\text{abs}(I_Z)}$ The method may further involve producing real and imaginary quadrature multiplication values for each of all unique possible combinations of array elements, in response to the modified amplitude values.

The real and imaginary quadrature components may be produced according to the relations:

$$M_{RAB} = (A_R B_R - A_I B_I);$$

$$M_{RAC} = (A_R C_R - A_I C_I);$$

$$\vdots$$

$$M_{RYZ} = (Y_R Z_R - Y_I Z_I)$$

and the imaginary quadrature components may be produced according to the relations:

$$M_{IAB} = (A_R B_I + A_I B_R);$$

$$M_{IAC} = (A_R C_I + A_I C_R);$$

$$\vdots$$

$$M_{IYZ} = (Y_R Z_I + Y_I Z_R)$$

where: A–Z denote array elements and can denote any number of a plurality of array elements The method may further involve summing the real quadrature components to produce a real magnitude value $M_R$ and summing the imaginary quadrature components to produce an imaginary magnitude value $M_I$.

The method may further involve summing the real and imaginary magnitude values $M_R$ and $M_I$ to produce a single value according to the relation:

$$M=\sqrt{M_R^2+M_I^2}$$

The method may further involve scaling the single value to produce an illumination value.

The method may further involve using the illumination value to control illumination of the pixel.

Producing synthesized time-amplitude representations of acoustic pressure received at respective array elements may involve performing a Fourier Transform on respective sets of data values representing time amplitude representations of acoustic pressure received at respective array elements to produce frequency domain representations of the time-amplitude representations, and performing an inverse Fourier Transform on respective frequency domain representations to produce respective synthesized time-amplitude representations.

Locating time positions associated with the pixel, on respective synthesized time-amplitude representations may involve, for each time amplitude representation, evaluating a function, describing a waveform approximating the synthesized time amplitude representation, dependent on a sample-defined position on the waveform and a delay value.

The method may further involve producing the delay value.

Producing the delay value may involve producing the delay value in response to an array-dependent delay value and a pixel-dependent delay value.

The method may further involve producing the array-dependent delay value and producing the pixel-dependent delay value.

Producing the array dependent delay value may involve producing a delay value according to a position of each array element relative to other array elements.

Producing the pixel-dependent delay value may involve determining a pixel-defined position along the waveform as a function of a sample-defined position along the waveform.

Producing synthesized time amplitude representations of acoustic pressure may involve receiving respective sets of data values representing time-amplitude representations of acoustic pressure received at respective array elements.

The method may further involve communicating with an apparatus operable to produce the data values to initiate receipt of the data values from the apparatus.

In accordance with another aspect of the invention, there is provided an apparatus for controlling a pixel on a display in response to sonar data from a plurality of array elements in a sonar array. The apparatus includes a processor circuit operable to access the sonar data and in communication with a display controller operable to control the display and memory accessible by the processor circuit. The memory is encoded with codes for directing the processor circuit to produce synthesized time-amplitude representations of acoustic pressure received at respective array elements, locate time positions associated with the pixel, on respective synthesized time-amplitude representations, produce real and imaginary components for the time positions, and cross-correlate the real and imaginary components to produce a scalar value to control illumination intensity of a pixel associated with the common pixel position.

The memory may be encoded with instructions for directing the processor circuit to produce modified amplitude values for the real and imaginary component values for each synthesized waveform according to the relations:

For $Z=A$ to $P$: $Z_R=\text{sign}(R_Z)\sqrt{\text{abs}(R_Z)}$ $Z_I=\text{sign}(I_Z)\sqrt{\text{abs}(I_Z)}$ The memory may be encoded with instructions for directing the processor circuit to produce real and imaginary quadrature multiplication values for each of all unique possible combinations of array elements, in response to the modified amplitude values.

The memory may be encoded with instructions for directing the processor circuit to produce the real and imaginary quadrature components according to the relations:

$$M_{RAB} = (A_R B_R - A_I B_I);$$

$$M_{RAC} = (A_R C_R - A_I C_I);$$

$$\vdots$$

$$M_{RYZ} = (Y_R Z_R - Y_I Z_I)$$

and the imaginary quadrature components may be produced according to the relations:

$$M_{IAB} = (A_R B_I + A_I B_R);$$

$$M_{IAC} = (A_R C_I + A_I C_R);$$

$$\vdots$$

$$M_{IYZ} = (Y_R Z_I + Y_I Z_R)$$

where A–Z denote array elements and can denote any number of a plurality of array elements The memory may be encoded with instructions for directing the processor circuit to sum the real and quadrature components to produce a real magnitude value $M_R$ and sum the imaginary quadrature components to produce an imaginary magnitude value $M_I$.

The memory may be encoded with instructions for directing the processor circuit to sum the real and imaginary magnitude values $M_R$ and $M_I$ to produce a single value according to the relation:

$$M = \sqrt{M_R^2 + M_I^2}$$

The memory may be encoded with instructions for directing the processor circuit to scale the scalar value to produce an illumination value.

The memory may be encoded with instructions for directing the processor circuit to use the illumination value to control illumination of the pixel.

The memory may be encoded with instructions for directing the processor circuit to produce synthesized time-amplitude representations of acoustic pressure received at respective array elements by performing a Fourier Transform on respective sets of data values representing time amplitude representations of acoustic pressure received at respective array elements to produce frequency domain representations of the time-amplitude representations, and performing an inverse Fourier Transform on respective frequency domain representations to produce respective synthesized time-amplitude representations.

The memory may be encoded with instructions for directing the processor circuit to locate time positions associated with the pixel, on respective synthesized time-amplitude representations by, for each time amplitude representation, evaluating a function, describing a waveform approximating the synthesized time amplitude representation, dependent on a sample-defined position on the waveform and a delay value.

The memory may be encoded with instructions for directing the processor circuit to produce the delay value.

The memory may be encoded with instructions for directing the processor circuit to produce the delay value in response to an array-dependent delay value and a pixel-dependent delay value.

The memory may be encoded with instructions for directing the processor circuit to produce the array-dependent delay value and produce the pixel-dependent delay value.

The memory may be encoded with instructions for directing the processor circuit to produce a delay value according to a position of the array element relative to other array elements.

The memory may be encoded with instructions for directing the processor circuit to produce the pixel-dependent delay value by determining a pixel-defined position along the waveform as a function of a sample-defined position along the waveform.

The memory may be encoded with instructions for directing the processor circuit to receive respective sets of data values representing time-amplitude representations of acoustic pressure received at respective array elements.

The memory may be encoded with instructions for directing the processor circuit to communicate with an apparatus operable to produce the data values to initiate receipt of the data values from the apparatus.

In accordance with another aspect of the invention, there is provided a computer readable medium and/or signal encoded with instructions for directing a processor circuit to execute the method for controlling a pixel on a display in response to sonar data and its variations described above.

Other aspects and features of the present invention will become apparent to those ordinarily skilled in the art upon review of the following description of specific embodiments of the invention in conjunction with the accompanying figures.

Many aspects of the invention including producing the synthesized waveform in particular can be implemented by a suitably programmed processor circuit, which keeps the cost of the apparatus to a minimum, and provides an accurate representation of the waveform, with less noise.

BRIEF DESCRIPTION OF THE DRAWINGS

In drawings which illustrate embodiments of the invention,

FIG. 12 is a representation of combinations of receive element number pairs that are multiplied together and then summed when carrying out the process shown in FIG. 11 for producing a high resolution display image.

DETAILED DESCRIPTION

Figure 1:
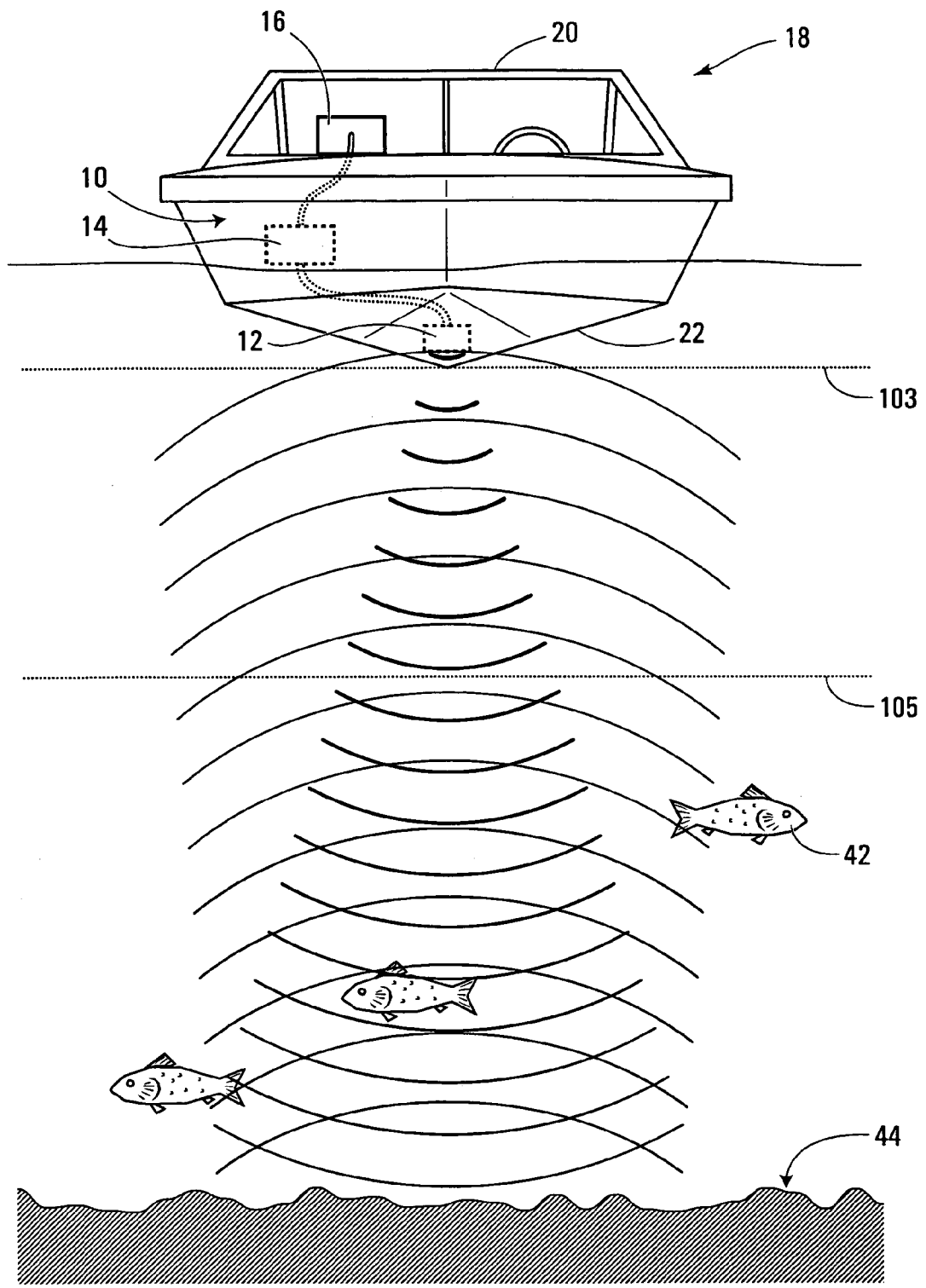
FIG. 1 is a schematic representation of a system including a sonar transducer unit and a remotely located processor having a display, according to a first embodiment of the invention.

Referring to FIG. 1, a system according to a first embodiment of the invention is shown generally at 10. The system includes a sonar transducer unit 12 and a remotely located processor 14 having a display 16. The remotely located processor 14 may be mounted on a boat 18 in a wheelhouse 20 thereof, for example and the sonar transducer unit 12 may be secured to the hull 22 of the boat 18 or may be towed behind, for example. In general, the processor 14 controls the sonar transducer unit 12 causing it to produce and receive sonar signals and send signals representing said sonar signals to the processor 14 for processing to produce a display image on the display 16, indicating underwater elements such as fish 42 or an ocean bottom 44, for example, that have reflected the sonar signals produced by the sonar transducer unit 12. The display image is produced by using the methods and apparatus described herein to calculate illumination values for each pixel within a field of view represented by the display.

Figure 2:
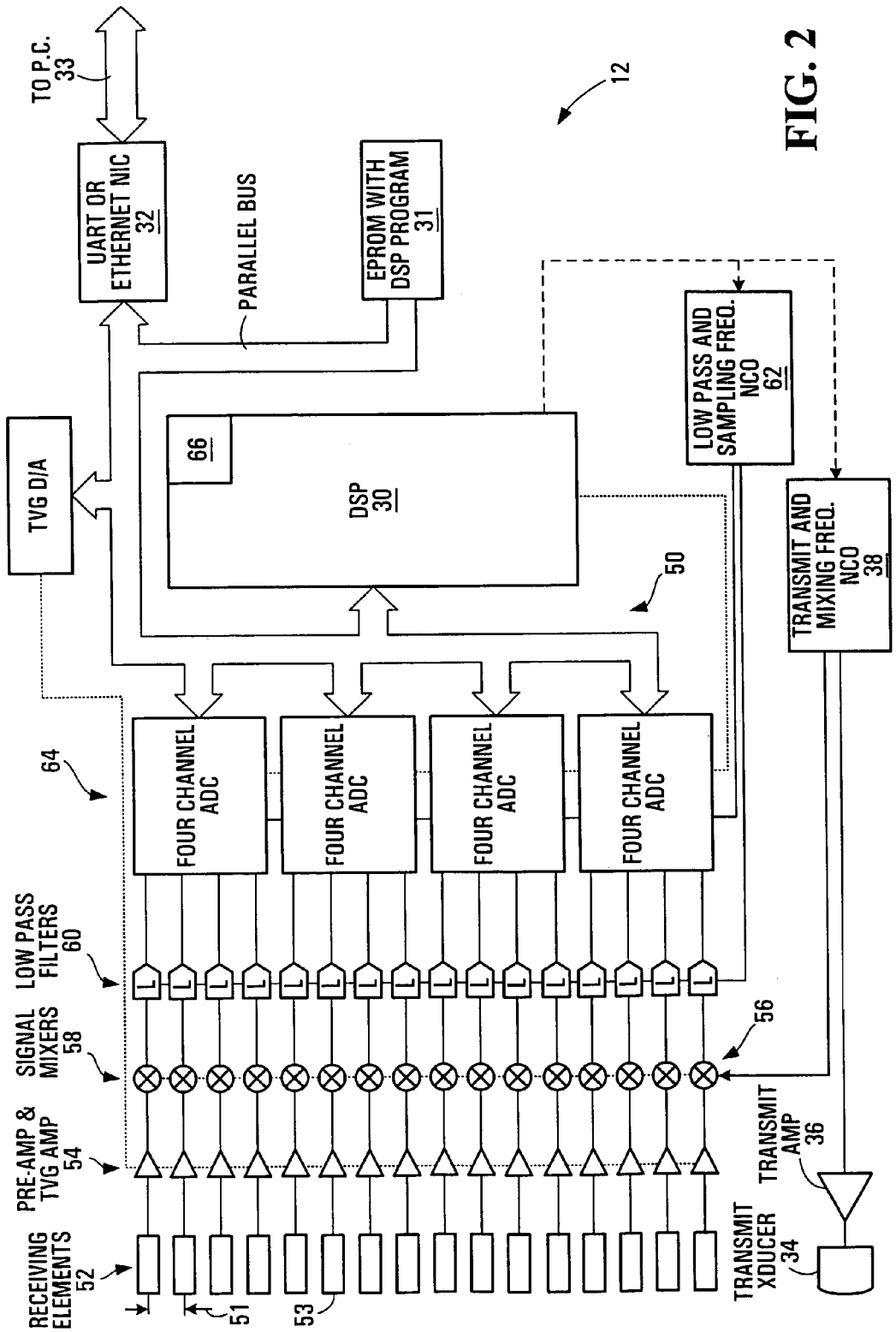
FIG. 2 is a block diagram of the sonar transducer unit shown in FIG. 1.

Referring to FIG. 2, the sonar transducer unit 12 is shown in greater detail. The sonar transducer unit 12 includes a digital signal processor (DSP) 30 controlled by a program stored in an Erasable Programmable Read Only Memory (EPROM) 31. The DSP 30 is in communication with a communications interface 32, which in this embodiment includes a Universal Asynchronous Receiver Transmitter (UART) or Ethernet Network Interface Chip, for example. The communications interface 32 is in communication with the processor 14 shown in FIG. 1, through a cable 33 extending from the transducer unit 12 to the processor 14 and facilitates communications between the DSP 30 and the processor 14. The DSP 30 is operable to receive a "remote" command signal from the processor 14, the remote command signal containing depth range information. The DSP extracts this depth range information and produces one or more "local" command signals to control various components of the sonar transducer unit 12.

Figures 3, 4:
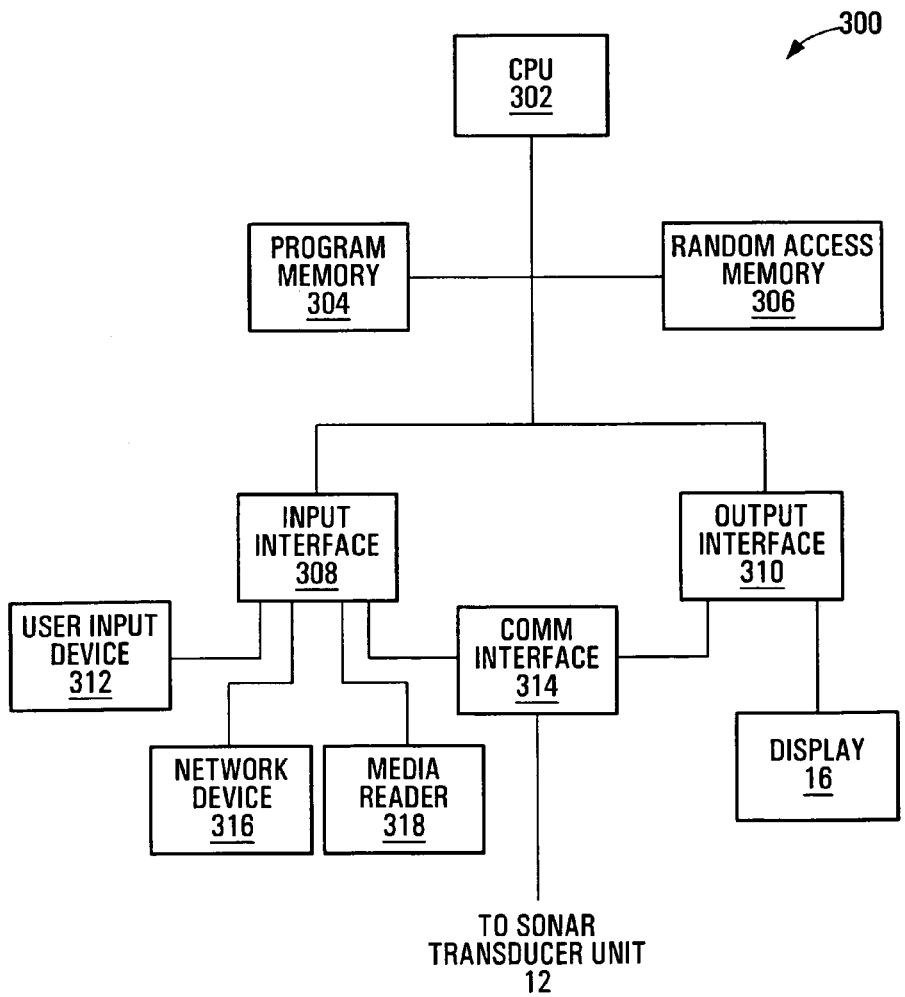
FIG. 3 is a table showing a relationship between depth range of interest, delta frequency, reference frequency, sample frequency, filter cutoff frequency respectively used by the transducer unit shown in FIG. 2.
FIG. 4 is a block diagram of a processor circuit of the remotely located processor shown in FIG. 1.

In this embodiment the sonar transducer unit 12 includes a sonar signal source, referred to hereafter as a transmit transducer or sonar signal transducer 34. The transmit transducer 34 produces sonar signals in response to electrical input signals received from a transmit amplifier 36 which receives input signals from a transmit and mixing frequency numerically controlled oscillator (NCO) 38 controlled by a local command signal produced by the DSP 30. In this embodiment, the DSP 30 and transmit and mixing frequency NCO 38 cooperate to cause the transmit transducer 34 to produce a sonar signal burst of acoustic energy having a "ping length", the ping length being dependent upon the depth range of interest specified in the local command signal. Exemplary ping lengths for various depth ranges of interest are shown in FIG. 3 and in general, ping length is longer for greater depth ranges and shorter for lesser depth ranges. The sonar signal burst of acoustic energy also has an acoustic frequency set by the transmit and mixing frequency NCO 38 in response to the local command. The acoustic frequency may be 320 kHz, for example, and in general, it may be any frequency that provides for suitable acoustic energy propagation in the medium (e.g., water) in which depth or distance is to be measured.

Referring back to FIG. 1, the burst of acoustic energy propagates through the water and is reflected by elements in the water, such as fish 42 or the ocean bottom 44, for example, which cause a reflected acoustic pressure signal burst to be reflected back to the transducer unit 12.

Referring to FIGS. 1 and 2, in general, the transducer unit 12 receives the reflected acoustic signal burst at a plurality of array elements 52 to produce a plurality of received signals, generates a reference signal having a reference frequency dependent on a depth range of interest, heterodynes each of the received signals with the reference signal to produce respective beat signals having a beat frequency, samples each of the beat signals at a sampling frequency dependent on the beat frequency to produce sets of sample values, each set of sample values being associated with a corresponding array element, and makes each set of sample values available for processing.

Figure 9:
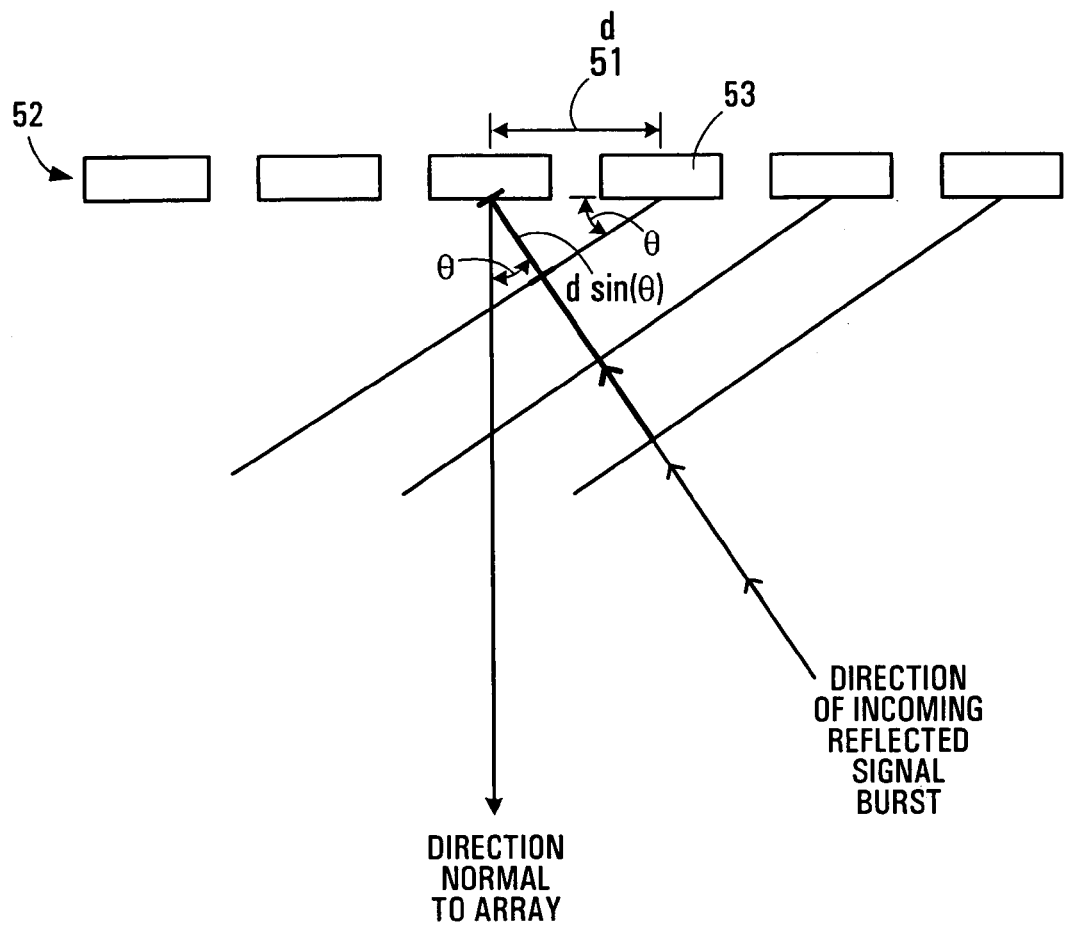
FIG. 9 is a schematic representation depicting a phase delay in receiving a sound wave at array elements of the sonar transducer unit shown in FIG. 2.

Referring back to FIG. 2, to carry out the above operations, the transducer unit 12 includes a sonar signal receiver apparatus such as shown generally at 50 comprising an array 52 of array elements 53 arranged linearly with a spacing 51 of about 3 mm between the array elements. Other spacings could be used. In the embodiment shown, there are 16 array elements 53 although more or less array elements may be employed. Referring to FIG. 9, the array elements 53 receive the reflected acoustic signal burst from any reflecting elements within the water. Generally, for any given beam angle $\theta$ measured from a line normal to the array 52, each array element 53 receives the reflected signal burst from a given reflecting element at a different time due to differences in distance between the given reflecting element and each array element resulting from the spacing 51 between the array elements in the array. In general, a reflected sound wave having the same amplitude-time properties is received at each array element 53 but appears to be shifted in time due to the differences in travel time of the reflected acoustic signal burst to reach respective array elements 53.

Referring back to FIG. 2, in this embodiment, each of the array elements 53 has an associated signal conditioning stage as shown generally at 54, which in this embodiment includes a pre-amplifier and time varying gain amplifier for producing a suitably strong amplified analog electrical signal representing the reflected acoustic signal received at a corresponding array element.

The receiver apparatus 50 further includes a heterodyning component shown generally at 56 operable to heterodyne each of the amplified array element signals with a reference signal to produce respective modulated signals. The reference signal is produced by the transmit and mixing frequency NCO 38 which acts as a reference signal frequency generator to produce the reference signal in response to the local command signal received from the DSP 30. As stated, the local command is produced by the DSP 30 in response to depth range information in the remote command received from the processor 14. In this embodiment, the reference signal has a reference frequency which is the sum of the acoustic frequency and a "delta" frequency. Delta frequencies and resulting reference frequencies for various depth ranges are shown in FIG. 3. Thus, in response to a local command signal indicating a depth range of interest, the reference frequency generator (NCO 38) produces a reference signal having a reference frequency as indicated in the table shown in FIG. 3.

Referring back to FIG. 2, the heterodyning component 56 includes a plurality of signal mixers shown generally at 58 which multiply the reference signal with respective individual amplified array element signals to produce respective mixed signals. It will be appreciated that a reference signal at a reference frequency associated with a particular depth range is mixed (multiplied) with the signals produced by each array element, which have a frequency at the acoustic frequency (e.g., 320 kHz). The resulting modulated signals each have sum and difference components having frequencies $$\frac{f_1 + f_2}{2}$$

and $$\frac{f_1 - f_2}{2}$$

respectively, which preserve the relative phase of the received sound pressure from the different receiver array elements. The difference component or beat component contains the amplitude information of the original received signal and has a beat frequency corresponding to the delta frequency employed for the particular depth range of interest. The beat components are used for further processing in this embodiment.

The difference components are applied to respective cutoff frequency controlled low pass filters as shown generally at 60 to produce respective beat signals. These filters are controlled to have a common cutoff frequency set by a cutoff frequency control signal produced by a low pass and sampling frequency numerically controlled oscillator (NCO) 62 controlled by a local command produced by the DSP 30. The NCO 62 produces the cutoff frequency signal such that the cutoff frequency of the cutoff frequency controlled low pass filters is dependent upon the beat frequency as determined by the delta frequency set according to the depth range of interest, in response to the local command received from the DSP 30. The low pass filters 60 thus produce a plurality of filtered beat signals associated with respective array elements 53, having a frequency dependent on the reference frequency.

Figure 8:
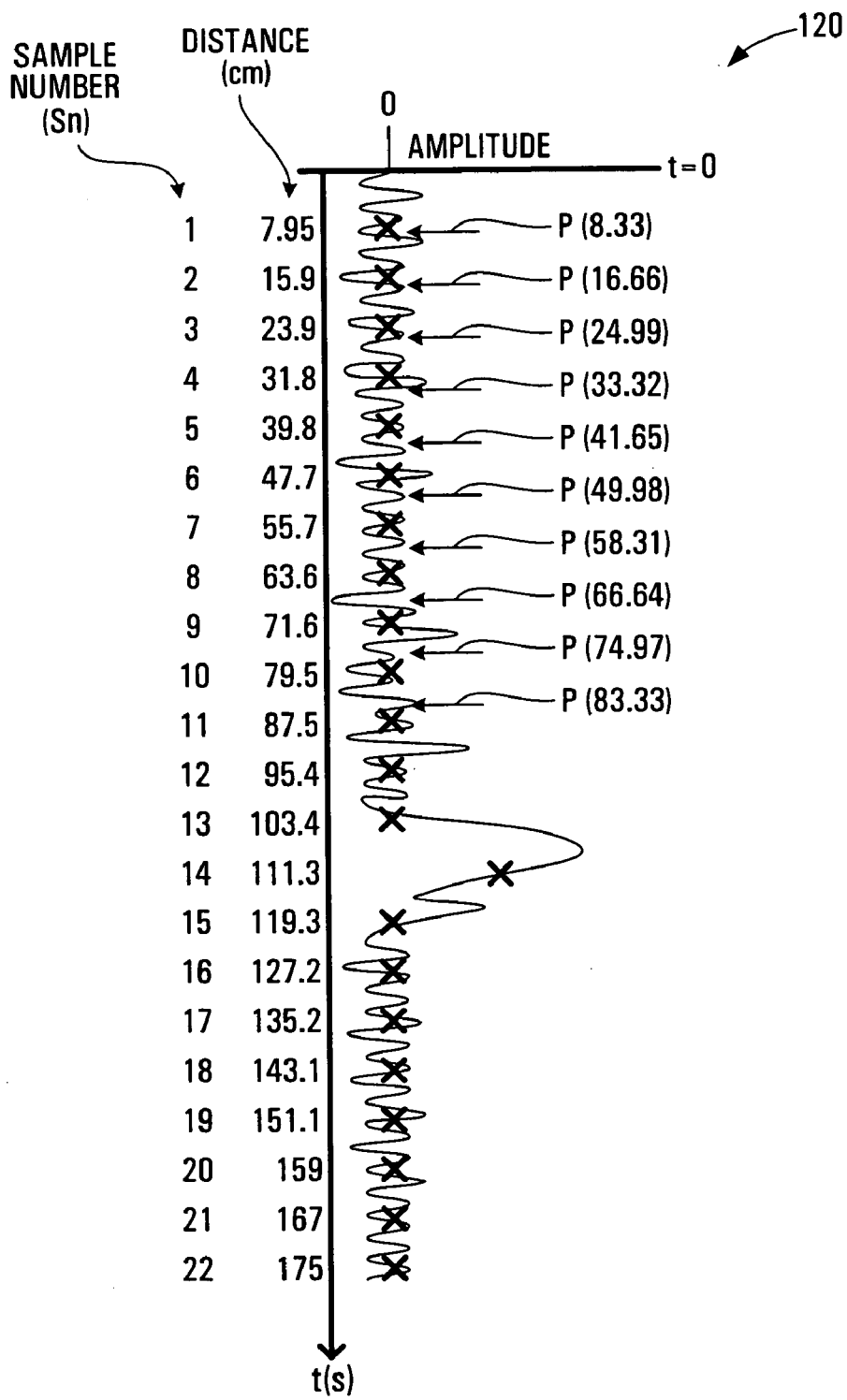
FIG. 8 is a graphical representation of a time-amplitude representation of a waveform produced by an array element of the sonar transducer unit of FIG. 2, showing sample-defined positions and pixel-defined positions.

Referring to FIG. 8, a time-amplitude representation of acoustic pressure received at a given array element 53 is shown generally at 120. Amplitude is shown relative to a reference value of zero with positive amplitude values being to the right of the zero value and negative amplitude values being to the left of the zero value. Time is shown increasing in the downward direction.

Time is related to distance by the speed of sound in water and thus increasing time relative to a reference time t=0 represents increasing distance from a reference point such as the array (52) in the sonar transducer unit 12 shown in FIG. 1.

Referring back to FIG. 2, the transducer unit 12 further includes a sampling component 64 which, in this embodiment, includes the DSP 30 and a plurality of four-channel analog to digital converters which cooperate to individually simultaneously sample each of the beat signals to produce sets of time domain sample values, each set being associated with a corresponding respective array element 53. The DSP 30 initiates sampling shortly after an acoustic burst is issued by the transmit transducer 34 and continues sampling until shortly after all reflected acoustic signals are expected to have been received, as determined by the depth range of interest.

The sets of sample values are stored in memory 66 incorporated in the DSP 30. To effect sampling, the DSP issues a local command to the low pass and sampling frequency NCO 62 which acts as a sampling signal frequency generator that generates a sampling signal for controlling the sampling component 64 to sample the filtered beat signals at a sampling frequency. The sampling frequency is set according to the depth range of interest and, more particularly, is set to be a multiple of the expected beat frequency of the beat signals, ultimately determined by the "delta" frequency. In this embodiment, the sampling frequency is set at 2.4615 times the delta frequency. Exemplary sampling frequencies for various depth ranges are shown in the table shown in FIG. 3. Referring back to FIG. 2, the sampling component 64 is controlled such that the same number of sample values is produced regardless of the depth range of interest. In this embodiment, 500 sample values are included in each set of sample values, regardless of range. Thus, in this embodiment, 16 sets of 500 samples are produced. The effect of producing the same number of samples regardless of the depth range of interest is that for greater depth ranges, the distance the sound travels between samples is greater than at lesser depth ranges. Fine resolution over long distances is usually not required and often exceeds the resolution of the display and thus, a larger number of samples at a greater depth range is not required.

Referring back to FIG. 8, sample points, i.e. times at which samples are taken by the sampling component 64 of FIG. 2, are shown with an x. The x's thus depict sample-defined positions along the waveform. A corresponding distance in cm for a 40 m-depth range of interest is shown for each sample point. A corresponding sample number $S_n$ is also shown. Thus, for example, sample number 6 is associated with a distance of 47.7 cm from the array 52.

Referring back to FIGS. 1 and 2, the programs in the EPROM 31 include program code for implementing a communications function to cause the DSP 30 to transmit to the processor 14, via the communications interface 32, the sets of sample values for further processing at the processor 14. These codes and the DSP 30 act as a communications component operable to communicate each set of sample values to the processor 14 for interpretation to control the illumination of pixels on the display 16 to ultimately produce a display image.

Processor

Referring back to FIG. 1, the processor 14 may include a Personal Computer (PC) style computer, for example, of the type having a 2.8 GHz Pentium IV processor chip, for example. Various computer implementations could be used, provided they have enough processing speed to perform the calculations described below sufficiently fast to avoid a noticeable delay in producing successive updates of a display image seen on the display 16. For completeness, an exemplary processor circuit, suitable to perform the operations described herein is shown at 300 in FIG. 4. The exemplary processor circuit includes a central processing unit (CPU) 302, program memory 304, random access memory 306 an input interface 308 and an output interface 310. The program memory 304 acts as a computer readable medium for storing program codes for directing the CPU, (hereinafter referred to as a processor) to carry out the functions described herein. The random access memory 306 is used by the processor to store the sets of sample values received from the sonar transducer unit 12, store delay values and store values produced as a result of calculations described herein. The input interface 308 is in communication with a user input device 312, which may include a keyboard, pointing device or other human interface. The input interface 308 and the output interface 310 are in communication with a communications unit 314 which is in communication with the sonar transducer unit 12 to permit the processor to send the above described remote command to the sonar transducer unit 12 and to permit the processor to receive the sets of sample values therefrom. The input interface 308 may include provisions such as a network interface 316 for receiving from a network such as the Internet computer readable signals encoded with codes operable to be stored in the program memory 304 for directing the processor to carry out one or more of the functional tasks described herein. In addition, or alternatively, the input interface 308 may be connected to a media reader 318 operable to read computer readable media that may provide codes operable to be stored in the program memory 304 for directing the processor to carry out one or more of the functional tasks described herein. The output interface 310 is in communication with the display 16 to control the display to produce an image representing objects beneath the boat.

In general, the codes stored in the program memory 304 direct the processor to carry out a method of producing an amplitude value for use in controlling illumination of a pixel on a display, in response to a sampled sonar signal produced by an element of the sonar array. The same method is used to produce amplitude values for all pixels within a viewing area of the display, to produce a composite image.

Figure 5:
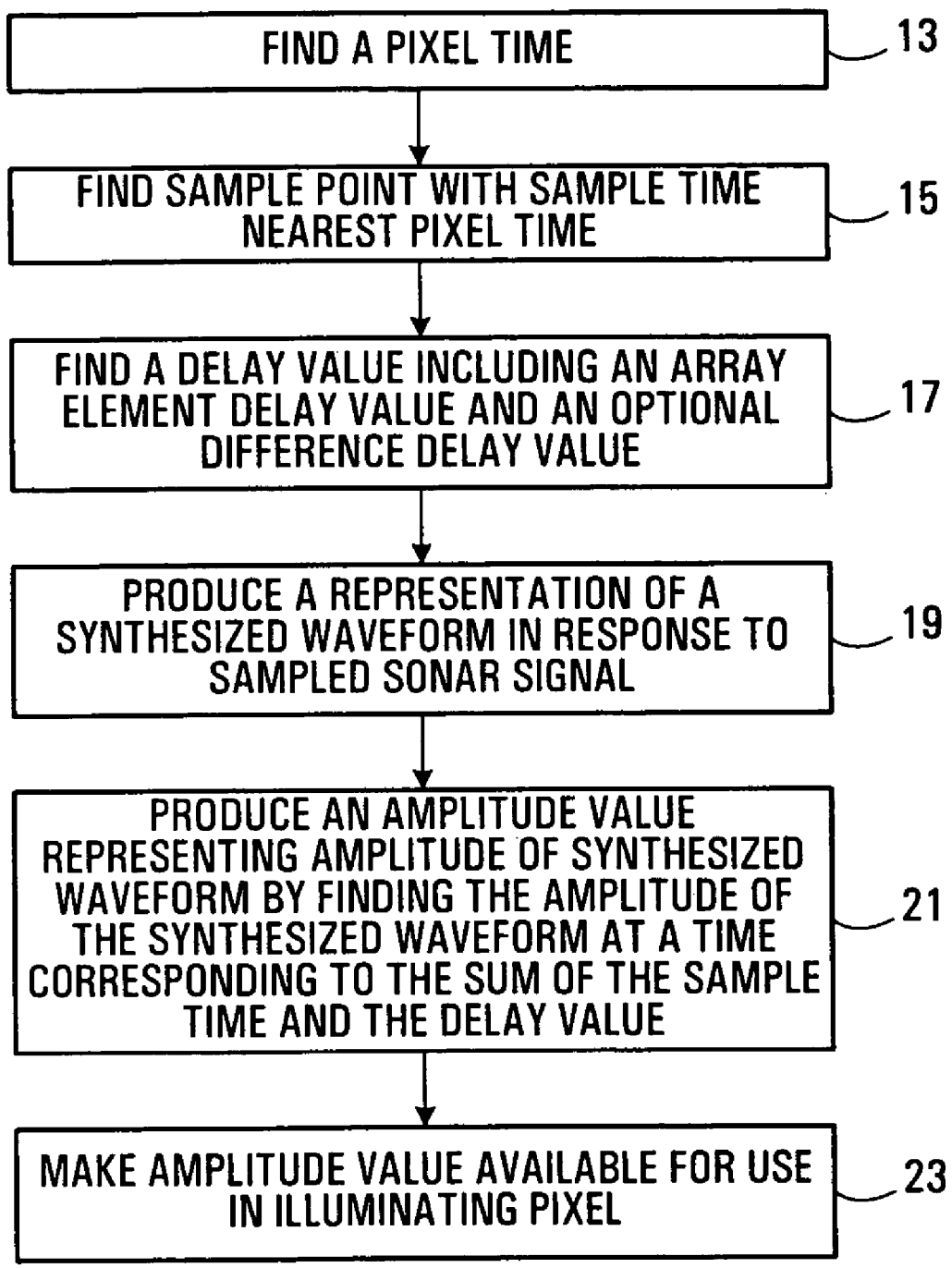
FIG. 5 is a flow chart representing a method of producing an amplitude value for use in controlling illumination of a pixel on the display shown in FIG. 1.

Referring to FIG. 5, as shown at 13 the method involves first finding a pixel time associated with the pixel, the pixel time representing a time required for sound to travel a distance represented by the pixel, according to a range of distance to be viewed on the display. As shown at 15, the method then involves finding a sample point of the sampled sonar signal, having a sample time nearest the pixel time and then as shown at 17, the method involves finding a delay value associated with the pixel, the delay value including an array element delay value and optionally a difference delay value representing a difference in time between the sample time and the pixel time. Next, as shown at 19, the method involves producing a representation of a synthesized waveform, in response to the sonar signal, the representation comprising a plurality of sample points coinciding in time with the sample points of the sonar signal. As shown at 21, the method then involves producing an amplitude value representing an amplitude of the synthesized waveform at a time corresponding to the pixel time by finding an amplitude value of the waveform at a time value corresponding to the sum of the sample time and the delay value. As shown at 23, the method then involves making the amplitude value available for use in illuminating the pixel. Making the amplitude available for use in illuminating the pixel allows the amplitude value to be combined with amplitude values produced in response to the sampled sonar signals of the remaining elements in the array, to produce an illumination value that can be used to control illumination intensity of the pixel on the display.

More particularly, in the embodiment shown, the codes direct the processor to pre-calculate delay values for each array element, the delay values including an array-derived component and an optional pixel-derived component and including sine and cosine components respectively. The codes also direct the processor to perform a Fourier Transform function on each set of sample values received from the transducer unit 12 and then to perform an Inverse Fourier Transform function, to produce sets of numbers representing real and imaginary component samples of a synthesized waveform produced from the original set of samples received from the transducer unit. The real and imaginary component sample values associated with a radian value nearest to a radian value associated with a pixel of interest are then multiplied by corresponding components of the pre-calculated delay values to advance or retard from the sample position along the synthesized waveform. The magnitude of the waveform at this position is taken as the representative magnitude for the given pixel position and array element. The above procedure is also done with the sample sets produced by the remaining array elements, for each pixel. Thus, 16 magnitude values are associated with each pixel. For each pixel, all 16 magnitude values associated with that pixel are combined such as by summing or by cross correlating to get a composite magnitude value. This composite value may be used as an intensity value to control illumination of the pixel.

One advantage of the system described is that the real and imaginary component values representing the synthesized waveform may be produced by software routines running on the processor and high accuracy can be maintained by using a suitable number of decimal places in the FFT, IFT, multiplication and summation and/or cross correlation functions. In general this results in greater accuracy than could be obtained by using hardware FFT, IFT, multiplication and summation and/or cross correlation components and reduces cost.

Figure 6:
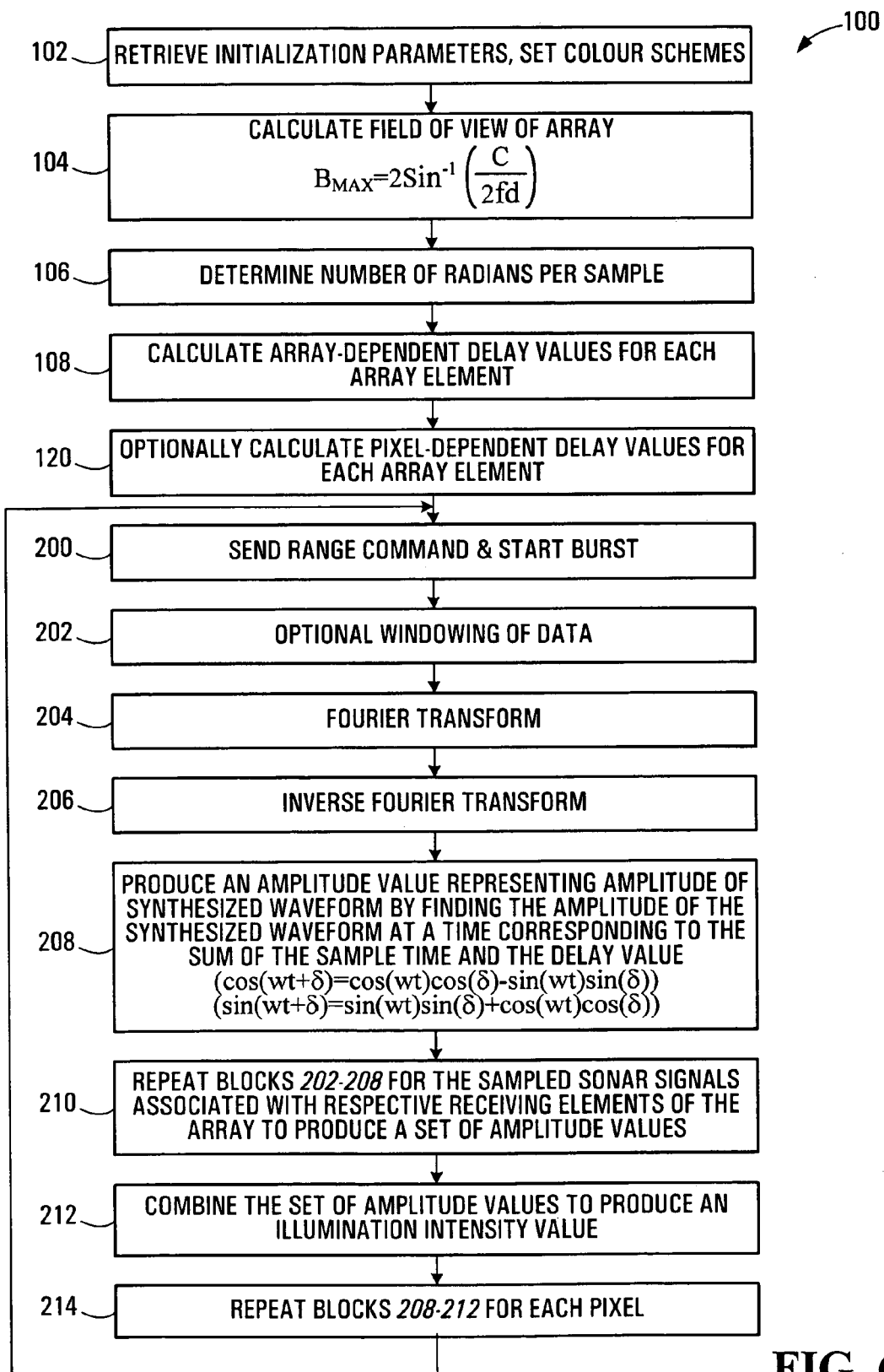
FIG. 6 is a flow chart representing blocks of code executed by the processor of the system shown in FIG. 1, for carrying out the method of FIG. 5.

In the embodiment described herein, the specific codes executed by the processor may be represented by detailed functional blocks such as shown in FIG. 6. Referring to FIGS. 1 and 6, a first set of codes is depicted by block 102 and directs the processor to retrieve initialization parameters from memory. Initialization parameters may be stored in a file and retrieved by the processor on power up. These initialization parameters may be used by the processor to set color schemes for the display 16, for example, by creating a mapping between signal intensity and color. The color red for example may be used to identify signal portions of greater intensity or amplitude, while blue for example may be used to represent signal intensity or amplitude near zero. The initialization parameters may also be used to initialize any mathematical variable or arrays used for computations to follow.

The processor may include routines, not shown, that cause it to receive user input from the user input device 312, or referring to FIG. 2, to communicate with the DSP 30 in the transducer unit 12, to acquire data indicating the number of array elements in the array 52 (e.g. 16), the spacing 51 between the array elements (e.g. 3 mm), the acoustic frequency (e.g. 320 kHz), the speed of sound in water (e.g. 1500 m/s), the sampling frequency used by the receiver (e.g. 9.375 kHz) and any other information that may be necessary. In addition user input may be provided through the user input device 312 to indicate to the processor the dimensions or useable area of the display 16 in pixels (e.g. 640×480), for example in which an image produced from the data sets produced by the transducer unit 12 may be displayed.

In addition, program codes (not shown) may be provided to present menus on the display 16 to permit a user to select a depth range of interest. The user may select a depth range of 5, 10, 20 or 40 meters, for example, and referring to FIG. 1, may select a reference plane 103 such as a plane coincident with the array, or a non-array coincident reference plane 105 at depth below the plane coincident with the array. The range may be set to 40 meters, for example and the reference plane may be set at 20 meters, for example, thus selecting an area of interest of between 20 and 40 meters depth. Regardless of the area of interest, once the area of interest is known, and the useable area of the display 16 is known, a mapping can be created to map the locations of pixels on the display to corresponding locations within the area of interest. In other words, pixel positions on the display are mapped to or associated with "pixel-defined positions" in the area of interest. In addition, once the range is known, the reference frequency, sample frequency and filter cutoff frequency to be used by the transducer unit may be determined from FIG. 3, before any acoustic energy is emitted or received.

Referring back to FIG. 6, after the initialization provided by block 102 has occurred, block 104 directs the processor to determine a field of view of the array according to the relation:

$$B_{max} = 2\sin^{-1}\left(\frac{c_s}{2fd}\right) \quad (1)$$

Where:
 $B_{max}$ is the field of view in degrees;
 $c_s$ is the speed of sound in water (e.g. 1500 m/s);
 f is the acoustic frequency (e.g. 320 kHz); and
 d is the array element spacing (e.g. 3 mm).

Using the above exemplary numbers, an exemplary field of view is 102.75 degrees centered on a line normal to the centre of the array. Once the field of view has been calculated the processor sets the color of every pixel associated with a location outside of the field of view of the array 52 to black, and only considers and performs calculations to determine illumination intensity for pixels at locations on the display 16 that have corresponding locations inside the field of view, in the area of interest.

After determining the field of view, block 106 directs the processor to pre-calculate the number of radians per sample of the original sound waves according to the relation:

$$R_d = 2\pi f/S_r \quad (2)$$

Where:
 $R_d$ is the number of radians per sample
 f is the frequency of the acoustic energy (e.g., 320 kHz)
 $S_r$ is the sample rate in samples per second (e.g., 9.375 kHz)

Referring to FIG. 8, the waveform produced by any given array element 53 generally has the form:

$$V_m = R_m \cos(\omega t) \quad (3)$$

Where:
 $V_m$ is the voltage produced by the $m^{th}$ array element
 $R_m$ is an amplitude value dependent on the amplitude of the reflected sound wave
 $\omega t$ is a time-dependent radian value based on the cyclic frequency $\omega$ of the acoustic energy. $\omega = 2(\pi)f_c$, where $f_c$ is the acoustic frequency e.g. 320 KHz)

Calculating Array-Dependant Delay Values

Referring to FIG. 9, if the sound energy reflected from a reflecting element is received at the array at an angle θ relative a direction normal to the array 52, the sound must travel a distance d sin θ after it is received at a given array element 53 before it is received at a subsequent array element. Thus to steer the array 52 to detect sound reflections from a given angle θ within the field of view, respective array-dependent time delays must be imposed on signals produced by the array elements 53 that receive the acoustic pressure before subsequent array elements.

The array-dependent time delay is given by the relation:

$$D = \frac{md\,\sin\theta}{c} \quad (4)$$

Where:
 D is the array-dependent time delay
 m is the $m^{th}$ array element
 d is the array element spacing
 θ is an angle of incidence of sound energy reflected from a reflecting element within the field of view
 c is the speed of sound in water (e.g. 1500 m/s)

The array-dependent delay D may be expressed in units of samples by multiplying the result of the calculation above by the sample rate $S_r$, to produce a range delay value Δ representing an array-dependent radian advancement or retardation as follows:

$$\Delta = \frac{mdS_r\sin\theta}{c} \quad (5)$$

Where:
 Δ is the range delay in units of samples
 m is the $m^{th}$ array element
 $S_r$ is the sampling frequency in samples per second
 d is the array element spacing
 θ is an angle of incidence of sound energy reflected from a reflecting element within the field of view
 c is the speed of sound in water The array dependent delay may be expressed in units of radians by multiplying Δ by the number of radians per sample $R_d$:

$$ST_r = \Delta R_d \quad (6)$$

Thus, in general, the suitably delayed waveform associated with a given array element m may be expressed as follows:

$$V_m = R_m \cos(\omega t + ST_r) \quad (7)$$

Where:
 $V_m$ is the voltage of the array element waveform
 $R_m$ is an amplitude value
 $\omega t$ is a time-dependent radian value
 $ST_r$ is the range delay value With sampling, effectively the ωt component of the above representation is determined by discrete instants in time corresponding to sample times. Thus, ωt may be given as:

$$\omega t = S_n R_d \quad (8)$$

Where:
 $S_n$ is the sample number
 $R_d$ is the pre-calculated number of radians per sample Thus, the full radian value to be evaluated in the cos term of the waveform representation may be expressed as a combination of a sample-defined component and the array-defined component as follows:

$$S_n R_d + ST_r \quad (9)$$

Referring back to FIG. 6 block 108 directs the processor to pre-calculate array-dependent delay values for a plurality of beam angles within the field of view. In the embodiment shown, array-dependent delay values may be calculated for 150 beam angles within the field of view according to the relation:

$$B[k], k = 1, 150 : ST_r[k][m] = \frac{md\omega \sin(B[k])}{c} \qquad (10)$$

Where:

B[k] is the $k^{th}$ beam angle m is the $m^{th}$ array element $ST_r$ is the range delay in units of radians d is the array element separation distance c is the speed of sound in water $\omega$ is the cyclic frequency of the acoustic burst The above relation provides a suitable approximation for calculating beam angle where it is assumed the sound wave impinging upon the array is a plane wave. Other geometric relations may be more suitable for calculating beam angles where the impinging sound wave is more spherical for example, i.e. at close range. For example, if a representation of a pixel position of interest can be obtained relative to the array simple triangulation can be used to determine a corresponding beam angle for that pixel and each array element.

This results in 150 array-dependent phase values, represented in units of radians, for each array element in the array 52. Sine and cosine values are then produced for each array element and beam angle, i.e., Sin($ST_r$[k][m]) and Cos($ST_r$[k][m]).

Figure 7:
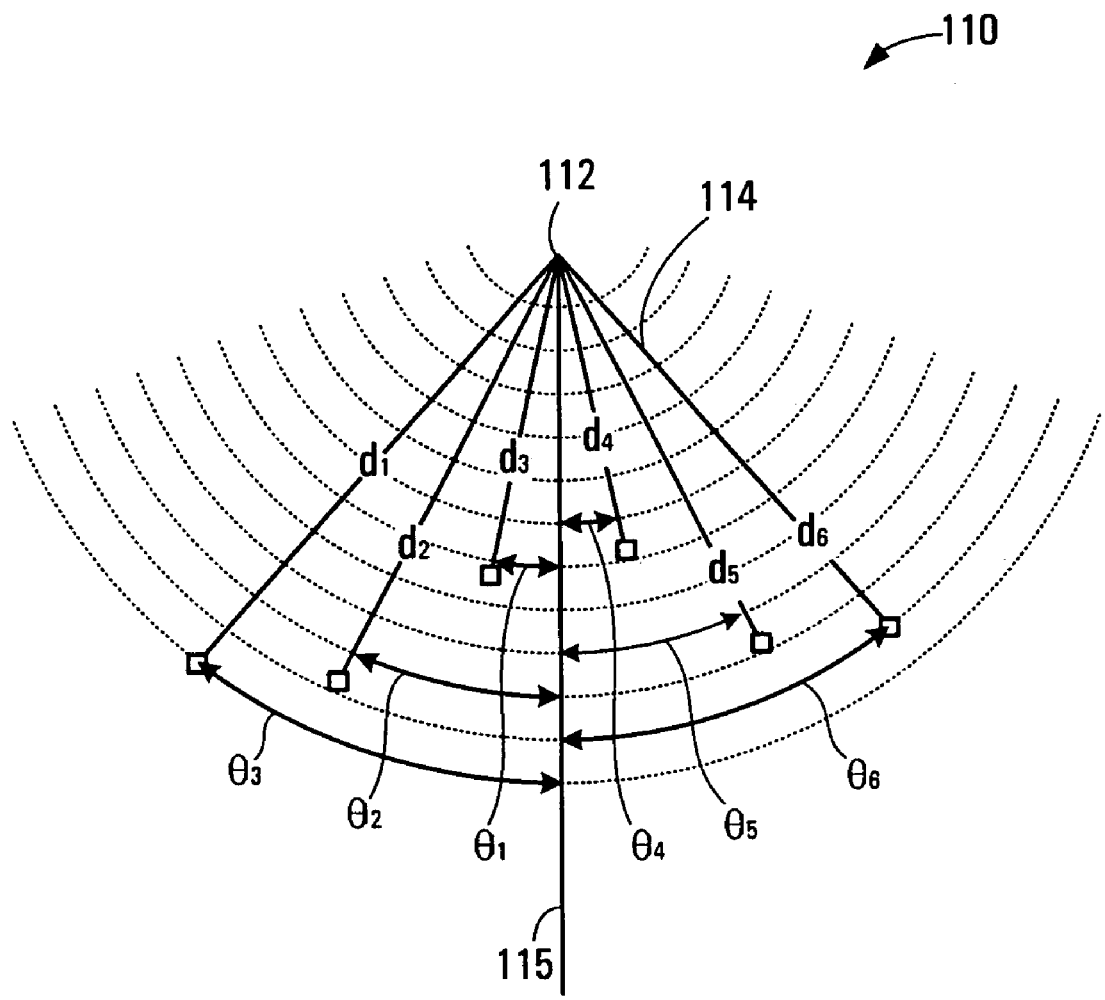
FIG. 7 is a schematic representation of a viewing area of the display shown in FIG. 1, where pixels are addressed by polar coordinates.

Referring now to FIG. 7, the viewing area 110 of the display 16 may include the entire display or a portion thereof. The viewing area 110 is defined by an array of pixels which are illuminated by the process described herein to indicate underwater objects within the field of view ($B_{max}$). If pixels in the viewing area 110 are addressed by polar coordinates as shown in FIG. 7, a reference point 112 may be defined, a plurality of rays 114 emanating from the reference point may be defined and pixels lying at different distances (d1–d6 for example) from the reference point may be addressed by specifying angle and distance values relative to a vertical line 115 and the reference point 112. In the embodiment shown, the field of view may be about 102.75 degrees and thus pixels within a 102.75 degree sector centered on the vertical line 115 are subject to illumination. The maximum number of pixels from the reference point may be 480, for example. In this embodiment, the 102.75 degree viewing angle is divided into 150 subsectors and array-dependent phase values are calculated as above, for each array element in the array and for each of the 150 angles. Each subsector is represented by a respective corresponding ray on the display 16. The sine and cosine values for a given subsector are then stored in association with each pixel along the corresponding ray on the display 16. In other words, array-dependent delay values are associated with each pixel subject to illumination.

In addition, the sample number of the nearest sample point to a pixel of interest is determined by dividing the pixel-defined distance by the sample distance as follows:

$$S_n = \text{int}(Pd/Nd) \qquad (11)$$

Sample numbers derived from the equation above are also stored in association with respective pixels. Thus, array dependent delay values and sample numbers are stored in association with each pixel in the viewing area of the display.

Effectively, for a given array element 53, the representative waveform shown in FIG. 8 may be considered to lie on one of the rays shown in FIG. 7 such that the zero time position is coincident with the reference point 112 and a maximum time point is coincident with the $480^{th}$ pixel along the ray. In effect, the representative waveform is mapped onto the ray on the display 16.

If the sampling frequency is 9.375 KHz, the sampling period is 1/9.375 KHz=106 microseconds. Since sound travels at approximately 1500 m/s in water, in the time between successive sample times, the sound travels 0.159 m, thus, between time=0 and the first sample time, the sound must travel from the transmit transducer to the underwater element and back to the array. The total distance traveled is twice the distance to the underwater element, thus, each time between samples represents a depth increment or sample distance of 0.159/2=0.0795 m, i.e., a sample distance of 7.95 cm. Sample distance values are thus shown at the left-hand side of FIG. 8, in 7.95 cm increments, corresponding to sample times. Sample numbers $S_n$ operable to be used to identify specific samples are shown at the far left hand side.

Referring to FIGS. 7 and 8, since the viewing area on the display 16 has a radius of 480 pixels, for a depth range of interest of 40 m, 480 pixels are used to represent 40 m, or 40/480=0.0833 m/pixel, i.e. a depth per unit radius of 8.33 cm/pixel. Thus, a plurality of pixel-defined positions p may be marked on the time-amplitude representation as shown. For a given range of interest, the pixels on the display viewing area will generally represent amplitude at different times t than the times x associated with samples.

Where the sample distance is less than or approximately equal to the pixel distance, the above approximation of associating the sample number of the nearest sample to the pixel of interest provides reasonable accuracy. Where the sample distance is more than slightly greater than the pixel distance, such as with a higher resolution display, or where greater accuracy is required, it may be desirable to calculate a difference delay value for use in addition to the sample-defined radian value and the array dependent delay value, for each pixel.

Calculating Difference Delay Values

Referring back to FIG. 6, block 120 is an optional block for use when it is desired to calculate difference delay values.

Block 120 directs the processor to pre-calculate difference delay values. The processor does this by, for a given pixel, calculating the depth represented by the pixel, from the radius associated with the pixel and the depth per unit radius. Then the processor determines which sample-defined point along the waveform has a depth value nearest the depth represented by the pixel-defined point P and determines what fraction of a sample period to advance or retard along the waveform from the nearest sample-defined point x to the pixel-defined point P. This fractional value represents the difference in time between the nearest sample time and the pixel time as a fraction of a sample period between two sample times nearest the pixel time. The processor identifies the nearest sample-defined point by the sample number $S_n$ and identifies the fractional value n to advance or retard along the waveform by taking the ratio of the difference between the depth represented by the sample-defined point and the depth represented by the pixel-defined point to the sample depth:

$$n = (S_d - P_d)/N_d \quad (12)$$

Where:
n is the fractional value to advance or retard
$S_d$ is the sample-defined distance (e.g. 79.5 cm)
$P_d$ is the pixel-defined distance (e.g. 83.33 cm)
$N_d$ is the sample distance (e.g. 7.95 cm)

Effectively, the fractional value n represents a ratio of the difference between a sample-defined distance and a pixel-defined distance to a sample distance.

The $\omega t$ component of equation 7 above may now be expressed as a function of the sample number and a fractional value as follows:

$$\omega t = S_n R_d + n R_d \quad (13)$$

Where:
$S_n$ is the sample number
$R_d$ is the pre-calculated number of radians per sample
n is a fractional value representing an amount of advancement or retarding from a nearest sample point to a point of interest along the waveform.

Now, taking into account the array-defined delay value $ST_r$, the full radian value to be evaluated in the cos term of the waveform representation may be expressed as:

$$S_n R_d + n R_d + ST_r \quad (14)$$

The term "$S_n$" represents the sample number, i.e. the $n^{th}$ sample point associated with a point of interest along the waveform, $R_d$ is the pre-calculated number of radians per sample, the $nR_d$ term represents a radian advancement value for interpolating between sample points and the term $ST_r$ represents the array-dependent radian advancement or retardation value for a given beam angle θ.

The difference delay value ($nR_d$) and the array-dependent delay value $ST_r$ associated with the pixel may be considered together as a combined delay value $nRd+ST_r$, in radians. The sine and cosine of this combined delay value i.e., $\sin(nR_d+ST_r)$ and $\cos(nR_d+ST_r)$ may then be computed and stored along with the identification of the nearest sample value in memory (306 in FIG. 4), in association with an identification of the pixel.

In effect the use of the array dependent delay value and the pixel dependent delay value within the sine and cosine terms amounts to interpolation of an array waveform value at a position between sample points. This is possible because of the linearity of the phase in the sinusoidal acoustic signals produced by the array elements and because the frequency of the acoustic signals is a known value, e.g. 320 kHz.

In summary, for each pixel, the processor produces sixteen position indicators associated with respective array elements. Each position indicator includes three values, including a sample number and sine and cosine delay values. The sample number $S_n$ represents the sample-defined point along the waveform that is nearest to a pixel-defined point defined by the distance of the pixel along a ray on the display 16. The sine and cosine delay values are values calculated as described above, and together represent the array-dependant delay $ST_r$ and, where desired the combination of the array-dependent delay $ST_r$ and the pixel-dependent difference delay $nR_d$ associated with the pixel, for each array element 53.

Position indicators are pre-stored for each pixel associated with a location in the viewing area. Thus, given the location of any pixel that represents a location in the viewing area, and the identity of a array element under consideration, the corresponding position indicator can be found. This position indicator will be useful in determining how to illuminate the pixel. Conveniently, before any acoustic energy is emitted, the position indicators, including delay values etc. can be pre-calculated and pre-stored for each pixel for immediate access later, when analysis of the signals representing the acoustic pressure received at the array is conducted. Position indicators can be calculated immediately upon the operator selecting a particular range of interest, for example.

Referring back to FIG. 6, having produced and stored position indicators for each pixel, the processor is now ready to receive data sets from the transducer unit. To do this, block 200 directs the processor to send the remote command to the transducer unit, the remote command indicating the range of view selected by the user. In response, as described above the transducer unit provides to the processor sixteen data sets of time amplitude values representing the sampled beat signals associated with respective array elements 53.

The processor may then optionally window the data sets by multiplying the data sets by multiplicative constants to reduce sidelobes, as shown by block 202.

Block 204 then directs the processor to produce frequency domain sample values in response to the time domain sample values of the sonar signal associated with a given array element by performing a Fourier Transform on respective data sets to produce respective transformed data sets and then block 206 directs the process to perform an inverse Fourier Transform on the transformed data sets to produce representations of synthesized waveforms representing the waveforms associated with respective array elements. A synthesized waveform for any given array element has the form:

$$A(t)\cos(\omega t) \quad (15)$$

Where:
A(t) is a time varying amplitude value dependent upon acoustic pressure received at the array element;
ω is 2πf, where f is the acoustic frequency; and
t is a time value representing time since sampling was started The inverse Fourier Transform effectively provides a plurality of cosine and sine values representing real and imaginary portions of the synthesized waveform at respective sample points in time, hereinafter referred to as Fourier sample times, which coincide with the sample times of the original waveforms. In this embodiment, there are 500 such Fourier sample points with associated amplitude values for each of the real and imaginary components (i.e., 1,000 sample points in total), representing each synthesized waveform. The use of the Fourier Transform, immediately followed by an inverse Fourier Transform, quickly and efficiently produces representations of the real and imaginary portions of the synthesized waveform for convenient use in later calculations.

Still referring to FIG. 6, after the processor has produced real and imaginary portions of the synthesized waveform, block 208 directs the processor to produce an amplitude value representing the amplitude of the synthesized waveform by finding the amplitude of the synthesized waveform at a time corresponding to the sum of the sample time and the delay value.

Since the synthesized waveform for a given array element 53 is considered to best approximate the waveform represented by the data set associated with the associated array element 53, for a given pixel it is desirable to use its associated position indicator with the synthesized waveform to find an amplitude value that best represents the acoustic pressure received by the array element at the time corresponding to the pixel-defined position along the waveform.

To find amplitude values along a given synthesized waveform, that correspond to pixel-defined locations, it is necessary to find the nearest Fourier sample point and then interpolate by moving along the time axis of the synthesized waveform by a delay amount to a time corresponding to a pixel-defined location.

In effect, this involves adding a respective phase delay δ to the synthesized waveform. In its simplest form only the cosine or sine term need be used to represent the periodic nature of the synthesized waveform. For example, using only the cosine term the synthesized waveform with delay can be represented as:

$$A(t)\cos(\omega t+\delta) \tag{16}$$

which can be mathematically expanded to:

$$A(t)\cos(\omega t+\delta)=A(t)\cos(\omega t)\cos(\delta)-A(t)\sin(\omega t)\sin(\delta) \tag{17}$$

Values for $A(t)\cos(\omega t)$ and $A(t)\sin(\omega t)$ at successive Fourier sample times identified by synthesized waveform sample numbers are provided by the real and imaginary components respectively of the synthesized waveform described above. Values for $\cos(\delta)$ and $\sin(\delta)$ are provided by the sine and cosine values (i.e., cos (STr) or $\cos(nR_d+ST_r)$ and sin (STr) or $\sin(nR_d+ST_r)$ respectively, pre-stored in memory as part of the position indicator associated with the pixel.

The nearest Fourier sample to any pixel-defined time of interest pixel is found by recalling the sample number stored in association with the pixel of interest. The real and imaginary component values of the synthesized waveform that are to be used as the $A(t)\cos(\omega t)$ and $A(t)\sin(\omega t)$ values respectively in equation 17 above are those that are associated with a synthesized waveform sample number corresponding to the sample number $S_n$ stored in association with the pixel of interest. The result of evaluating equation 17 with the indicated values is that an amplitude value is produced by adding the product of the cosine values for the sample point having a sample time nearest the pixel time and the delay value respectively to the product of the sine values for the sample point having a sample time nearest the pixel time and the delay value respectively.

The amplitude value represents an amplitude of a synthesized waveform representing the signal received at the associated array element, at a time corresponding to a pixel-defined position (i.e. pixel time) along the waveform and adjusted in phase relative to signals received at other array elements of the array.

Alternatively, only the sine term may be used in adding the delay to the waveform, the sine term having the form:

$$\sin(\omega t+\delta)=\sin(\omega t)\cos(\delta)+\cos(\omega t)\sin(\delta) \tag{18}$$

Thus the amplitude value may be alternatively produced by adding the product of the sine value for the sample point having a sample time nearest the pixel time and the cosine of the delay value respectively to the product of the cosine value for the sample point having a sample time nearest the pixel time and the sine of the delay value respectively.

Alternatively, both the cosine and sine terms may be used, i.e. $\cos(\omega t+\delta)$ and $\sin(\omega t+\delta)$ amplitude values may be calculated by equations 17 and 18 respectively and a combined amplitude value may be produced according to the relation below in which the value M represents the amplitude value of the synthesized waveform:

$$M=\sqrt{\cos^2(\omega t+\delta)+\sin^2(\omega t+\delta)} \tag{19}$$

Regardless of how the amplitude value is calculated, block 210 directs the processor to repeat blocks 202–208 until an amplitude value for each of the respective array elements 53 is produced. A set of amplitude values M1–M16 is thus produced, for each pixel.

Block 212 then directs the processor to combine each amplitude value in the set to produce an illumination intensity value. Combining the amplitude values may involve summing the amplitude values to form an amplitude sum value. The amplitude sum value may then be rectified to produce only positive values which are then subjected to color and intensity mapping determined at block 102 above, to produce a color and intensity value to be provided to the display 16 to cause the pixel to be illuminated with an appropriate color and/or an appropriate intensity. Block 214 then directs the processor to repeat blocks 208–212 for each pixel corresponding to a location within the field of view. The entire display image is thus complete.

Since the array-dependent delay values and where desired, pixel-dependent delay values are pre-calculated, after the 16 sets of samples values are received from the transducer unit 12, the processor circuit merely addresses each pixel to be illuminated and for each pixel retrieves its associated position indicator and performs the calculations of equation 17, equation 18 or both equation 17 and 18 and equation 19. Thus, illumination information for a given pixel can be obtained quickly, accurately and efficiently.

Figure 10:
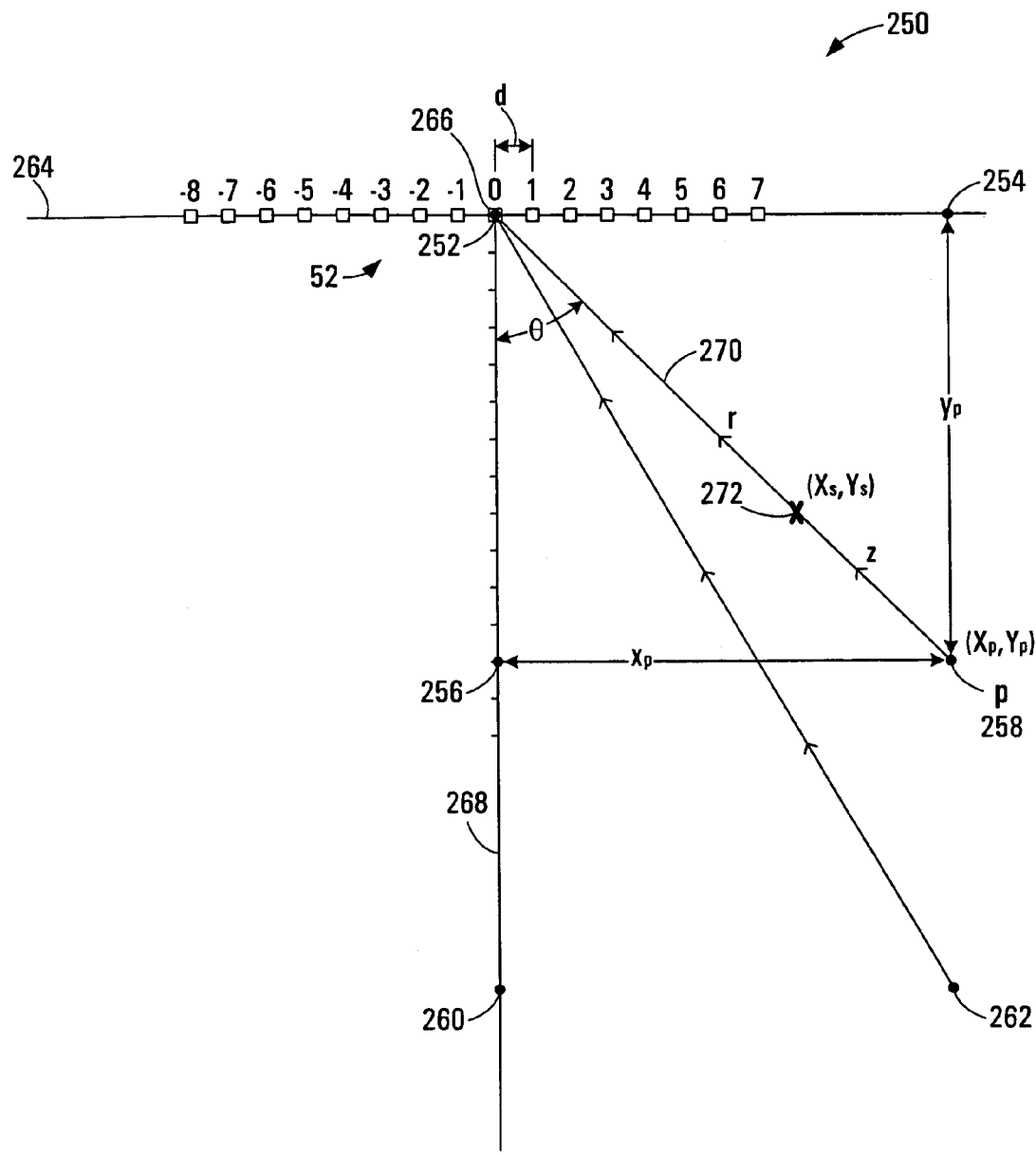
FIG. 10 is a schematic representation of a small portion of the display shown in FIG. 1, showing pixel addressing using rectangular coordinates.

The example above has been described using polar coordinates to calculate the array dependent delay and where desired, the pixel-dependent delay. In an alternative embodiment, rectangular coordinates may be used. Referring to FIG. 10, a small portion of a rectangular pixel display is shown generally at 250. Overall the rectangular portion may have dimensions of 640 by 480 pixels, for example. Only 6 pixels 252, 254, 256, 258, 260, 262 of the display are shown. Assume that a line 264 drawn through two of the pixels 252 and 254 represents a zero-time position i.e. the plane 103 shown in FIG. 1. For explanatory purposes array elements 53 of the receiver array 52 are shown superimposed on the first pixel 252 such that a centre of an array element 266 in approximately the centre of the array 52 is coincident with a centre of the first pixel 252. The array element 266 may be designated as a zeroth element, the remaining array elements progressively farther to the left hand side of the drawing may be designated −1 to −8 and the remaining array elements progressively farther to the right hand side of the drawing may be designated 1 to 7.

For a sound wave traveling toward the array 52 at an angle (θ) relative to a line 268 extending from the zeroth array element, perpendicular to the array, the sound wave is detected by array element 7 first, and then the array elements successively to the left of the $7^{th}$ array element.

The array elements can be mapped into pixel coordinates $X_m$, $Y_m$, using $$X_m=md/D_p, Y_m=0. \tag{20}$$

Where:
m is the $m^{th}$ array element (for m: −8 to +7)
d is the separation distance between array elements.
$D_p$ is the number of pixels per meter.

Referring back to FIG. 10, each pixel such as pixel 258 of the pixel display may be considered to lie at coordinates (Xp, Yp). Xp is the horizontal axis (x) coordinate of pixel 258, where the horizontal axis is coincident with line 264. Yp is the vertical axis (y) coordinate of the pixel 258, where the vertical axis is coincident with line 268.

In the embodiment described, the pixel display is 480 pixels long in the vertical direction beneath the reference line 264. If the user-specified depth range is 40 m, the represented depth per unit distance between each pixel $D_p$ is 40/480=0.083 m/pixel. The sample is distance as described above, and is 7.95 cm, allowing for two way travel time.

For any given pixel at position (Xp, Yp) the one-way distance in pixels (at the user-specified depth-range) a sound wave will travel before being detected by a given array element m is given by:

$$r=\sqrt{(X_p+X_m)^2+Y_p^2} \quad (21)$$

This distance can be expressed as a pixel distance in meters by:

$$P=rD_p \quad (22)$$

From a pixel distance in meters, the round-trip travel time for the sound to be emitted from the transmitter, reflected from an object at the calculated pixel distance and received at the array element can be converted into a travel time using the speed of sound:

$$D=2P/c \quad (23)$$

Where:

D is the travel time in seconds c is the speed of sound in water.

The 2 is because the sound must travel two ways to convert from distance in meters to time. The travel time D may be expressed in units of samples using the sample rate:

$$\Delta=S_r D \quad (24)$$

Where:

$\Delta$ is the travel time in units of samples $S_r$ is the sampling frequency in samples per second The nearest sample $S_n$ to the point Xp, Yp can be found by rounding off the value of $\Delta$ to the nearest integer $$S_n=int(\Delta) \quad (25)$$

The travel time $\Delta$ may be converted to radians by multiplying by the number of radians per sample. The sine and cosine of the travel time in radians may then be stored along with the sample number $S_n$ as position indicators for the pixel of interest. Since in equation (21) the actual pixel positions and representative array positions are used, the travel time value inherently includes both an array delay and a pixel delay and thus can be used as a total array delay value $\delta$.

Since $\delta$ is a radian value sin $\delta$ and cos $\delta$ values repeat every $2\pi$. The array and pixel dependent phase inherent therein is thereby preserved despite the fact that $\delta$ could become a very large number.

Thus, from the foregoing, a single number representing the delay $\delta$ in equation (16) above may be calculated and the sine and cosine of this radian delay value $\delta$ may be calculated and stored along with the nearest sample number $S_n$ described above, in association with the pixel. These values thus act as position indicators and may be called by the processor for use in combination with the synthesized waveform described above to find an amplitude value for a given pixel and array element.

The procedure for determining illumination properties for any given pixel is then carried out as described above, in response to amplitude values associated with respective array elements 53.

Hi Resolution Mode

Higher resolution than provided by simply summing the amplitude values described above may be obtained by cross correlation. When both the $\cos(\omega t+\delta)$ term and the $\sin(\omega t+\delta)$ terms are produced using equations 17 and 18 above, in effect, the processor produces a number pair ($R_x$, $I_x$) representing real and imaginary portions of the synthesized waveform at the desired point along the synthesized waveform for a given array element where $R_x=\cos(\omega t+\delta)$ and $I_x=\sin(\omega t+\delta)$ and x is an index representing an array element A to P.

Figure 11:
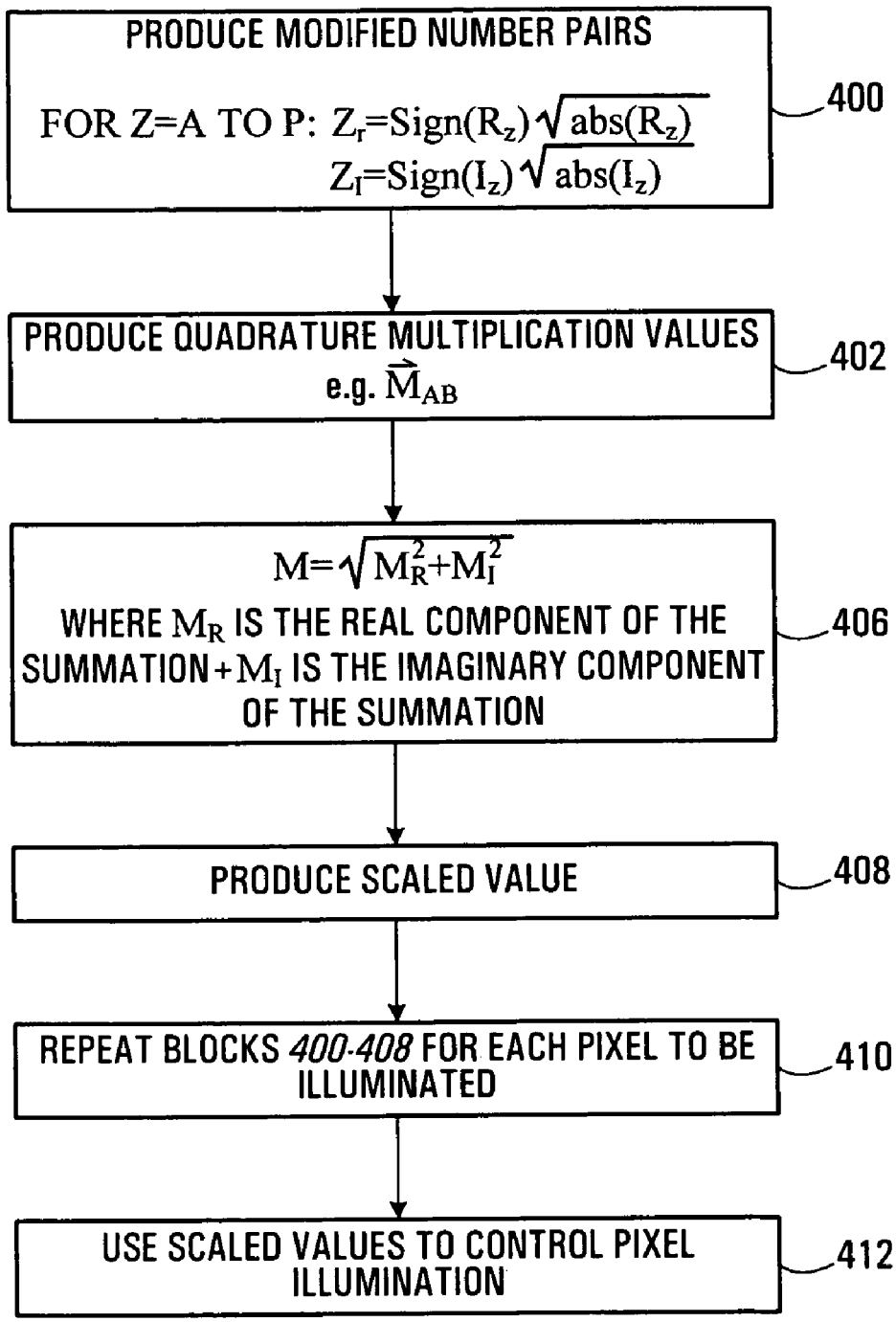
FIG. 11 is a flow chart representing blocks of code executed by the processor of the system shown in FIG. 1, for carrying out a process for producing a high resolution display image.

Referring to FIG. 11, a high resolution cross correlation process executed by the processor begins with a first block 400 that directs the processor to produce modified amplitude values ($Z_R$, $Z_I$) for Z=A to P for each respective number in the number pair ($R_x$, $I_x$) for x=A to P produced by equations 17 and 18 above for each array element (A to P) according to the relations:

$$\text{For } Z=A \text{ to } P: Z_R=\text{sign}(R_Z)\sqrt{\text{abs}(R_Z)} \quad (26)$$

$$Z_I=\text{sign}(I_Z)\sqrt{\text{abs}(I_Z)}$$

The modified amplitude number pairs for receive elements A–P may be designated ($A_R$, $A_I$) ... ($P_R$, $P_I$).

Block 402 then directs the processor to produce real and imaginary quadrature multiplication values $M_R$ and $M_I$ using the modified number pairs (($A_R$, $A_I$), etc.) associated with respective receive elements, for each of all uniquely possible combinations of array elements. These multiplication values are produced by multiplying each modified amplitude number pair with each other, in quadrature, with no duplicates. A representation of the combinations of number pairs multiplied is shown in FIG. 12. Real and imaginary quadrature multiplication values for example $M_{R(AB)}$ and $M_{I(AB)}$, for the product of the number pairs for array elements A and B, are produced according to the following exemplary equation:

$$\vec{M}_{AB}=A_R B_R - A_I B_I + (A_R B_I + A_I B_R)i \quad (27)$$

The real multiplication value $M_{R(AB)}$ is given by ($A_R B_R - A_I B_I$) and the imaginary multiplication value $M_{I(AB)}$ is given by ($A_R B_I + A_I B_R$).

Real and Imaging quadrature multiplication values are produced in a similar manner for each combination of array elements.

Block 406 then directs the processor to sum all of the real magnitude values $M_{R(AB)}$, etc. and all of the imaginary values $M_{I(AB)}$, etc. to produce net real and net imaginary summation components $M_R$ and $M_I$ and then to produce an overall magnitude value M from the relation $M=\sqrt{M_R^2+M_I^2}$, as shown in FIG. 12.

Block 408 then directs the processor to produce a scaled value by scaling this single value into a desired range. This scaled value may then be used as the illumination value for use in controlling illumination of the associated pixel.

As shown by block 410, the procedure above is repeated for each pixel associated with a viewing area of the array, and as shown at block 412 the scaled values are used to control pixel illumination for said pixels to produce a high resolution display. Blocks 200–214 are repeatedly executed to constantly refresh the display image.

From the foregoing, it will be appreciated that after the synthesized waveforms are produced, two ways have been shown for using the synthesized waveforms to produce an illumination value operable to be used to control illumination of a pixel on a display. In general, both ways involve producing synthesized time-amplitude representations of acoustic pressure received at respective array elements, and locating time positions associated with the pixel of interest, on respective synthesized time-amplitude representations. The high resolution mode however, involves producing real and imaginary components for the time positions and cross correlating the real and imaginary components to produce a single value to control illumination intensity of a pixel associated with the common pixel position. In effect, cross-correlating comprises producing modified amplitude values for the real and imaginary component values for each synthesized waveform according to the relations:

For $Z=A$ to $P$: $Z_R = \text{sign}(R_Z)\sqrt{\text{abs}(R_Z)}$ (28)

$Z_I = \text{sign}(I_Z)\sqrt{\text{abs}(I_Z)}$

Then, real and imaginary quadrature multiplication values $M_{R(AB)} \ldots M_{R(OP)}$ and $M_{I(AB)} \ldots M_{I(OP)}$ are produced for each of all unique possible combinations of array elements, in response to the modified amplitude values. The real quadrature multiplication values are produced according to the relations:

$$M_{RAB} = (A_R B_R - A_I B_I);$$
$$M_{RAC} = (A_R C_R - A_I C_I);$$
$$\vdots$$
$$M_{RYZ} = (Y_R Z_R - Y_I Z_I)$$

and the imaginary quadrature components are produced according to the relations:

$$M_{IAB} = (A_R B_I + A_I B_R);$$
$$M_{IAC} = (A_R C_I + A_I C_R);$$
$$\vdots$$
$$M_{IYZ} = (Y_R Z_I + Y_I Z_R)$$

where: A–Z denote array elements and can denote any number of a plurality of array elements.

All of the multiplication values and all of the real imaginary quadrature multiplication values are respectively summed to produce net real and net imaginary components $M_R$ and $M_I$ respectively and an overall magnitude value M is produced according to the relation:

$M = \sqrt{M_R^2 + M_I^2}$ (29)

The magnitude value M may then be scaled to produce a single scalar value to produce an illumination value operable to be used to control illumination of the pixel, in particular the intensity and/or color of illumination.

Illumination values for pixels may be subjected to coordinate transformations (not shown) to enable the illumination values to be used to create displays from a variety of different perspectives. For example, display images may be rotated by such transformations. To facilitate greater speed, transformations may be done once the position values, i.e., sample number and sin δ and cos δ have been determined and the results of such transformations may be stored for direct use in producing a transformed display image (e.g. rotated), obviating the need to transform as part of determining illumination values while live data acquisition is in progress.

While specific embodiments of the invention have been described and illustrated, such embodiments should be considered illustrative of the invention only and not as limiting the invention as construed in accordance with the accompanying claims.

What is claimed is:

1. A method of producing an amplitude value for use in controlling illumination of a pixel on a display, in response to a sampled sonar signal produced by an element of a sonar array, the method comprising:
    finding a pixel time associated with said pixel, said pixel time representing a time required for sound to travel a distance represented by said pixel, according to a range of distance to be viewed on said display;
    finding a sample point of the sampled sonar signal, having a sample time nearest said pixel time;
    finding a delay value associated with said pixel, said delay value including an array element delay value;
    producing a representation of a synthesized waveform, in response to said sonar signal, said representation comprising a plurality of sample points coinciding in time with the sample points of said sonar signal;
    producing an amplitude value representing an amplitude of said synthesized waveform at a time corresponding to said pixel time by finding an amplitude value of said waveform at a time value corresponding to the sum of said sample time and said delay value; and
    making said amplitude value available for use in illuminating said pixel.

2. The method of claim 1 wherein producing a representation of said synthesized waveform comprises producing a plurality of cosine and sine values representing real and imaginary portions of said synthesized waveform at respective sample points in time.

3. The method of claim 2 wherein finding a sample point comprises finding the cosine and sine values for a sample point having a sample time nearest said pixel time.

4. The method of claim 3 wherein finding a delay value comprises finding cosine and sine amplitude values for said delay value.

5. The method of claim 4 wherein producing an amplitude value comprises adding the product of said cosine values for said sample point having a sample time nearest said pixel time and said delay value respectively to the product of said sine values for said sample point having a sample time nearest said pixel time and said delay value respectively.

6. The method of claim 5 wherein producing an amplitude value comprises adding the product of the sine value for said sample point having a sample time nearest said pixel time and the cosine of the delay value respectively to the product of the cosine value for said sample point having a sample time nearest said pixel time and the sine of said delay value respectively.

7. The method of claim 4 wherein producing an amplitude value comprises adding the product of the sine value for said sample point having a sample time nearest said pixel time and the cosine of the delay value respectively to the product of the cosine value for said sample point having a sample time nearest said pixel time and the sine of said delay value respectively.

8. The method of claim 1 wherein said delay value is pre-calculated, before said representation of said synthesized waveform is produced.

9. The method of claim 1 wherein producing said representation of said waveform comprises producing frequency domain sample values in response to time domain sample values of the sonar signal.

10. The method of claim 9 wherein producing said series of frequency domain sample values comprises performing a Fourier Transform on said time domain sample values.

11. The method of claim 10 further comprising performing an inverse Fourier Transform on said frequency domain sample values.

12. The method of claim 11 wherein said Fourier Transform and said inverse Fourier Transform are performed by a processor programmed to execute a Fourier Transform and an inverse Fourier Transform.

13. The method of claim 12 wherein said processor produces a plurality of cosine and sine values representing real and imaginary portions of said synthesized waveform at respective sample points in time.

14. The method of claim 1 wherein finding a delay value comprises locating a pre-stored delay value in memory.

15. The method of claim 14 wherein said pre-stored delay value is stored in said memory before said representation of said synthesized waveform is produced.

16. The method of claim 14 further comprising calculating said pre-stored delay value as a function of said array element delay value and a difference delay value representing a difference in time between said sample time and said pixel time.

17. The method of claim 1 wherein finding said delay value comprises calculating said array element delay value by calculating array-dependent delay values for a plurality of beam angles within a field of view of the array.

18. The method of claim 17 wherein said array-dependent delay values are calculated as function of array element separation distance, sampling rate of the sonar signal, beam angle and speed of sound.

19. The method of claim 18 wherein said array-dependent delay values associated with respective beam angles are stored in association with identifications of pixels on the display that are associated with the same beam angle.

20. The method of claim 16 further comprising calculating said difference delay value by calculating a fractional value representing said difference in time between said sample time and said pixel time as a fraction of a sample period between two sample times nearest said pixel time.

21. The method of claim 20 wherein calculating said fractional value comprises finding a ratio of the difference between a sample-defined distance and a pixel-defined distance to a sample distance on said synthesized waveform.

22. The method of claim 21 wherein calculating said difference delay value comprises multiplying said fractional value by the number of radians per sample at an acoustic frequency of said sonar signal.

23. The method of claim 22 further comprising for each pixel associated with a distance within said field of view of said array, adding an associated array dependent delay value to an associated difference delay value to produce said delay value and finding cosine and sine values for said delay value.

24. The method of claim 23 further comprising storing said cosine and sine values for said delay value in association with an identification of a pixel with which said delay value is associated.

25. The method of claim 1 further comprising repeating the method of claim 1 for each element in said sonar array until amplitude values, for each element in said array are available for said pixel.

26. The method of claim 25 further comprising summing said amplitude values for each element in said array to produce an illumination value for said pixel.

27. The method of claim 26 further comprising using said illumination value to control illumination of said pixel.

28. The method of claim 9 further comprising repeating the method of claim 9 for the sonar signal from each respective receive element to produce real and imaginary component values for the synthesized waveforms associated with respective array elements.

29. The method of claim 28 further comprising producing modified amplitude values for the real and imaginary component values for each synthesized waveform according to the relations:

For $Z=A$ to $P$: $Z_R = \text{sign}(R_Z)\sqrt{\text{abs}(R_Z)}$ $Z_I = \text{sign}(I_Z)\sqrt{\text{abs}(I_Z)}$.

30. The method of claim 29 further comprising producing real and imaginary quadrature multiplication values for each of all unique possible combinations of array elements, in response to said modified amplitude values.

31. The method of claim 30 wherein said real quadrature components are produced according to the relations:

$$M_{RAB} = (A_R B_R - A_I B_I);$$
$$M_{RAC} = (A_R C_R - A_I C_I);$$
$$\vdots$$
$$M_{RYZ} = (Y_R Z_R - Y_I Z_I)$$

and wherein said imaginary quadrature components are produced according to the relations:

$$M_{IAB} = (A_R B_I + A_I B_R);$$
$$M_{IAC} = (A_R C_I + A_I C_R);$$
$$\vdots$$
$$M_{IYZ} = (Y_R Z_I + Y_I Z_R)$$

where A–Z denote any elements and can denote any number of a plurality of array elements.

32. The method of claim 31 further comprising summing said real quadrature components to produce a real magnitude value $M_R$ and summing said imaginary quadrature components to produce an imaginary magnitude value $M_I$.

33. The method of claim 32 further comprising summing said real and imaginary magnitude values $M_R$ and $M_I$ to produce a single value according to the relation:

$M = \sqrt{M_R^2 + M_I^2}$.

34. The method of claim 33 further comprising scaling said single value to produce an illumination value.

35. The method of claim 34 further comprising using said illumination value to control illumination of said pixel.

36. An apparatus for producing an amplitude value for use in controlling illumination of a pixel on a display, in response to a sampled sonar signal produced by an element of a sonar array, the apparatus comprising:

a component operable to find a pixel time associated with said pixel, said pixel time representing a time required for sound to travel a distance represented by said pixel, according to a range of distance to be viewed on said display;

a component operable to find a sample point of the sampled sonar signal, having a sample time nearest said pixel time;

a component operable to find a delay value associated with said pixel, said delay value including an array element delay value;

a component operable to produce a representation of a synthesized waveform, in response to said sonar signal, said representation comprising a plurality of sample points coinciding in time with the sample points of said sonar signal;

a component operable to produce an amplitude value representing an amplitude of said synthesized waveform at a time corresponding to said pixel time by finding an amplitude value of said waveform at a time value corresponding to the sum of said sample time and said delay value; and a component operable to make said amplitude value available for use in illuminating said pixel.

37. The apparatus of claim 36 wherein said component operable to produce a representation of said synthesized waveform comprises a processor configured to produce a plurality of cosine and sine values representing real and imaginary portions of said synthesized waveform at respective sample points in time.

38. The apparatus of claim 37 wherein said component operable to find a sample point comprises a processor configured to find cosine and sine values for a sample point having a sample time nearest said pixel time.

39. The apparatus of claim 38 wherein said component operable to find a delay value comprises a processor configured to find cosine and sine amplitude values for said delay value.

40. The apparatus of claim 39 wherein said component operable to produce an amplitude value comprises a processor configured to add the product of said cosine values for said sample point having a sample time nearest said pixel time and said delay value respectively to the product of said sine values for said sample point having a sample time nearest said pixel time and said delay value respectively.

41. The apparatus of claim 40 wherein said component operable to produce an amplitude value comprises a processor configured to add the product of the sine value for said sample point having a sample time nearest said pixel time and the cosine of the delay value respectively to the product of the cosine value for said sample point having a sample time nearest said pixel time and the sine of said delay value respectively.

42. The apparatus of claim 39 wherein said component operable to produce an amplitude value comprises a processor configured to add the product of the sine value for said sample point having a sample time nearest said pixel time and the cosine of the delay value respectively to the product of the cosine value for said sample point having a sample time nearest said pixel time and the sine of said delay value respectively.

43. The apparatus of claim 36 wherein said component operable to find said delay value includes a processor configured to pre-calculate said delay value, before said representation of said synthesized waveform is produced.

44. The apparatus of claim 36 wherein said component operable to produce said representation of said waveform comprises a processor configured to produce frequency domain sample values in response to time domain sample values of the sonar signal.

45. The apparatus of claim 44 wherein said processor is configured to perform a Fourier Transform on said time domain sample values.

46. The apparatus of claim 45 wherein said processor is configured to perform an Inverse Fourier Transform on said frequency domain sample values.

47. The apparatus of claim 46 wherein said processor is configured to produce a plurality of cosine and sine values representing real and imaginary portions of said synthesized waveform at respective sample points in time as a result of said Inverse Fourier Transform.

48. The apparatus of claim 36 wherein said component operable to find a delay value includes a memory for storing a pre-stored delay value and a processor configured to locate said pre-stored delay value in memory.

49. The apparatus of claim 48 wherein said processor is configured to pre-store said pre-stored delay value in said memory before said representation of said synthesized waveform is produced.

50. The apparatus of claim 48 wherein said processor is configured to calculate said pre-stored delay value as a function of said array element delay value and a difference delay value representing a difference in time between said sample time and said pixel time.

51. The apparatus of claim 36 wherein said processor is configured to find said array element delay value by calculating array-dependent delay values for a plurality of beam angles within a field of view of the array.

52. The apparatus of claim 51 wherein said processor is configured to calculate said array-dependent delay values as function of array element separation distance, sampling rate of the sonar signal, beam angle and speed of sound.

53. The apparatus of claim 52 wherein said processor is configured to store said array-dependent delay values associated with respective beam angles in association with identifications of pixels on the display, that are associated with the same beam angle.

54. The apparatus of claim 50 wherein said processor is configured to calculate said difference delay value by calculating a fractional value representing said difference in time between said sample time and said pixel time as a fraction of a sample period between two sample times nearest said pixel time.

55. The apparatus of claim 54 wherein said processor is configured to calculate said fractional value by finding a ratio of the difference between a sample-defined distance and a pixel-defined distance to a sample distance on said synthesized waveform.

56. The apparatus of claim 55 wherein said processor is configured to calculate said difference delay value by multiplying said fractional value by the number of radians per sample at an acoustic frequency of said sonar signal.

57. The apparatus of claim 56 wherein said processor is configured to add an associated array dependent delay value to an associated difference delay value to produce said delay value and find cosine and sine values for said delay value, for each pixel associated with a distance within said field of view of said array.

58. The apparatus of claim 57 further comprising memory and wherein said processor is configured to store said cosine and sine values for said delay value in association with an identification of a pixel with which said delay value is associated.

59. The apparatus of claim 36 wherein each of said components listed in claim is implemented by the same processor and wherein said processor is configured to produce amplitude values for each element in said array for a given pixel.

60. The apparatus of claim 59 wherein said processor is configured to sum said amplitude values for each element in said array to produce an illumination value for said pixel.

61. The apparatus of claim 60 wherein said processor is configured to use said illumination value to control illumination of said pixel.

62. The apparatus of claim 44 wherein said processor is configured to produce real and imaginary component values for synthesized waveforms associated with respective array elements.

63. The apparatus of claim 62 wherein said processor is configured to produce modified amplitude values for said real and imaginary component values for each synthesized waveform according to the relation:

For $Z = A$ to $P$: $Z_R = \text{sign}(R_Z)\sqrt{\text{abs}(R_Z)}$ $Z_I = \text{sign}(I_Z)\sqrt{\text{abs}(I_Z)}$.

64. The apparatus of claim 63 wherein said processor is configured to produce real and imaginary quadrature multiplication values for each of all unique possible combinations of array elements, in response to said modified amplitude values.

65. The apparatus of claim 64 wherein said processor is configured to produce said real quadrature multiplication components according to the relations:

$$M_{RAB} = (A_R B_R - A_I B_I);$$
$$M_{RAC} = (A_R C_R - A_I C_I);$$
$$\vdots$$
$$M_{RYZ} = (Y_R Z_R - Y_I Z_I)$$

and wherein said imaginary quadrature components are produced according to the relations:

$$M_{IAB} = (A_R B_I + A_I B_R);$$
$$M_{IAC} = (A_R C_I + A_I C_R);$$
$$\vdots$$
$$M_{IYZ} = (Y_R Z_I + Y_I Z_R)$$

where A–Z denote any elements and can denote any number of a plurality of array elements.

66. The apparatus of claim 65 wherein said processor is configured to sum said real quadrature components to produce a real magnitude value $M_R$ and to sum said imaginary quadrature components to produce a quadrature magnitude value $M_I$.

67. The apparatus of claim 66 wherein said processor is configured to sum said real and imaginary magnitude values $M_R$ and $M_I$ to produce a single value M according to the relation:

$$M = \sqrt{M_R^2 + M_I^2}.$$

68. The apparatus of claim 67 wherein said processor is configured to scale said single value to produce an illumination value.

69. The apparatus of claim 68 wherein said processor is configured to use said illumination value to control illumination of said pixel.

70. A computer readable medium encoded with codes for directing a processor to execute the method of claim 1.

71. A computer readable signal encoded with codes for directing a processor to execute the method of claim 1.

72. An apparatus for producing an amplitude value for use in controlling illumination of a pixel on a display, in response to a sampled sonar signal produced by an element of a sonar array, the apparatus comprising:

means for finding a pixel time associated with said pixel, said pixel time representing a time required for sound to travel a distance represented by said pixel, according to a range of distance to be viewed on said display;

means for finding a sample point of the sampled sonar signal, having a sample time nearest said pixel time;

means for finding a delay value associated with said pixel, said delay value including an array element delay value;

means for producing a representation of a synthesized waveform, in response to said sonar signal, said representation comprising a plurality of sample points coinciding in time with the sample points of said sonar signal;

means for producing an amplitude value representing an amplitude of said synthesized waveform at a time corresponding to said pixel time by finding an amplitude value of said waveform at a time value corresponding to the sum of said sample time and said delay value; and means for making said amplitude value available for use in illuminating said pixel.

* * * * *